US011251980B2

(12) United States Patent
Gorsica et al.

(10) Patent No.: US 11,251,980 B2
(45) Date of Patent: Feb. 15, 2022

(54) ELECTRONIC DEVICES AND CORRESPONDING METHODS FOR VERIFYING DEVICE SECURITY PRIOR TO USE

(71) Applicant: Motorola Mobility LLC, Chicago, IL (US)

(72) Inventors: John Gorsica, Round Lake, IL (US); Rachid Alameh, Crystal Lake, IL (US)

(73) Assignee: Motorola Mobility LLC, Chicago, IL (US)

(*) Notice: Subject to any disclaimer, the term of this patent is extended or adjusted under 35 U.S.C. 154(b) by 64 days.

(21) Appl. No.: 16/749,756

(22) Filed: Jan. 22, 2020

(65) Prior Publication Data

US 2021/0226805 A1    Jul. 22, 2021

(51) Int. Cl.
*H04L 9/32* (2006.01)
*H04L 9/08* (2006.01)
*G06F 12/14* (2006.01)

(52) U.S. Cl.
CPC ........ *H04L 9/3271* (2013.01); *G06F 12/1408* (2013.01); *H04L 9/0866* (2013.01); *H04L 9/0894* (2013.01); *H04L 9/3263* (2013.01)

(58) Field of Classification Search
CPC ... H04L 9/3271; H04L 9/0866; H04L 9/0894; H04L 9/3263
See application file for complete search history.

(56) References Cited

U.S. PATENT DOCUMENTS

| | | | |
|---|---|---|---|
| 2013/0254846 A1* | 9/2013 | Ganem | G06F 21/606 726/3 |
| 2014/0026204 A1* | 1/2014 | Buntinx | H04L 63/168 726/9 |
| 2014/0171029 A1* | 6/2014 | Holtmanns | H04W 12/06 455/411 |
| 2014/0317716 A1 | 10/2014 | Chao et al. | |
| 2015/0143474 A1* | 5/2015 | Vallee | H04L 63/18 726/4 |

(Continued)

OTHER PUBLICATIONS

"About Genuine Windows", Support Page; "What is Validation" and "What are the most common reasons Windows fails Validation" Unknown publication date but prior to filing of present application; Viewed online Jan. 22, 2020.

(Continued)

*Primary Examiner* — Shanto Abedin
(74) *Attorney, Agent, or Firm* — Philip H. Burrus, IV

(57) ABSTRACT

To ensure that an electronic device is a secure electronic device, a communication device transmits a request to authenticate the electronic device to a remote electronic device across a network. The communication device receives a security challenge. One or more processors of the electronic device obtain a response to the security challenge using a secret key stored in an encrypted memory of the electronic device. The communication device then transmits the response to the response to the security challenge to the remote electronic device. If the remote electronic device recognizes the response, it transmits a shared secret content marker, which can optionally be presented at a user interface of the electronic device. The request can be automatically initiated by a companion electronic device.

20 Claims, 8 Drawing Sheets

(56) References Cited

U.S. PATENT DOCUMENTS

| | | | |
|---|---|---|---|
| 2015/0180869 A1* | 6/2015 | Verma | H04L 63/0884 |
| | | | 726/4 |
| 2017/0048275 A1* | 2/2017 | John | G06F 21/6227 |
| 2017/0201382 A1* | 7/2017 | Lindteigen | H04L 9/3263 |
| 2017/0329978 A1 | 11/2017 | Dave et al. | |
| 2018/0123782 A1 | 5/2018 | Messerges | |
| 2018/0336332 A1* | 11/2018 | Singh | H04L 9/3271 |
| 2018/0343250 A1* | 11/2018 | Tang, Jr. | H04L 63/123 |
| 2019/0052617 A1* | 2/2019 | Chen | H04L 9/3265 |
| 2020/0154276 A1* | 5/2020 | Minakawa | H04L 9/08 |
| 2020/0287910 A1* | 9/2020 | Zerrad | H04L 63/0471 |
| 2020/0336895 A1* | 10/2020 | Bartlett | H04W 12/06 |
| 2021/0036859 A1* | 2/2021 | Sukhomlinov | H04L 9/0897 |
| 2021/0091950 A1* | 3/2021 | Asher | H04L 9/3271 |

OTHER PUBLICATIONS

"RSA SecurID Hardware Tokens", Datasheet; Published Oct. 2015; Viewed online at https://www.rsa.com/en-us/products/rsa-securid-suite/rsa-securid-access/securid-hardware-tokens.

Bogdan-Cosmin, et al., "A security authorization scheme for smart home Internet of Things devices", Published in Future Generation Computer Systems; vol. 86; Sep. 2018; Viewed online at https://www.sciencedirect.com/science/article/abs/pii/S0167739X17311020.

* cited by examiner

ELECTRONIC DEVICES AND CORRESPONDING METHODS FOR VERIFYING DEVICE SECURITY PRIOR TO USE

BACKGROUND

Technical Field

This disclosure relates generally to electronic devices, and more particularly to electronic devices having data communication capabilities.

Background Art

Modern electronic devices such as laptop computers, smartphones, tablet computers, and smart watches, are becoming increasingly more configurable due to the fact that a user can select what applications to run on the device, what data should be stored on the device, how information should be presented on the device, how information should be shared with other devices, and so forth. Moreover, the advent of "cloud" based services have taken many applications out of the physical confines of one particular electronic device, thereby allowing, for example, a person to access an electronic mail application on a multitude of different devices. Since some users may desire to access such applications using third-party devices, i.e., public devices or devices owned by other people, it would be advantageous to have devices and methods to ensure that such devices are secure prior to employing the same to access personal information, data, and accounts.

Figure 1:
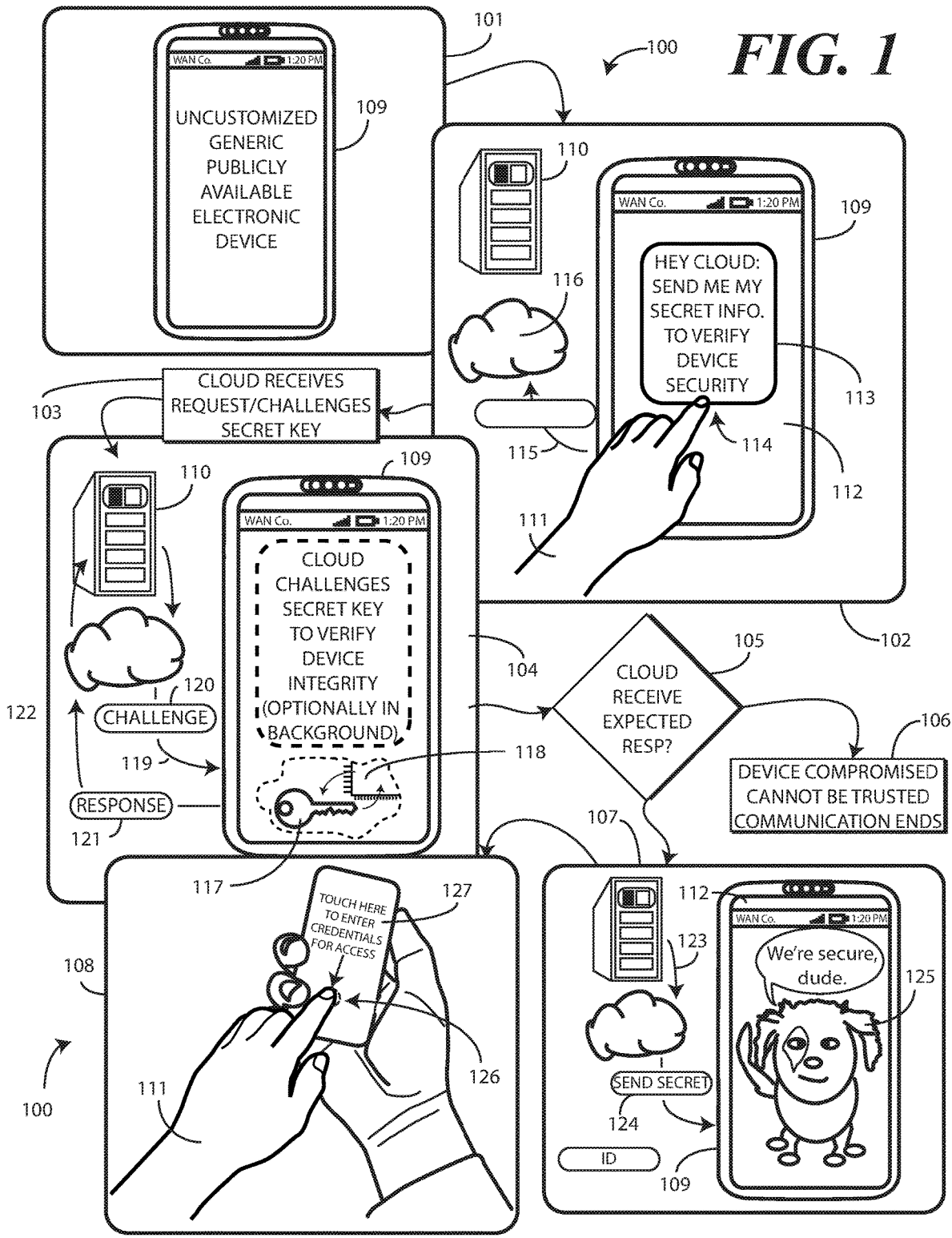
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining whether an electronic device is a secure electronic device or trusted electronic device, e.g., not corrupt with malware, viruses, or other digital maladies, prior to using such a device to access personal accounts, information, data, and applications. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of transmitting requests to authenticate electronic devices as secure or trusted electronic devices, receiving security challenges in response to these requests, answering the security challenges using a secret key stored in an encrypted memory, and receiving a shared secret or shared secret content marker allowing a user to confirm that the electronic device is indeed a secure electronic device or trusted electronic device. The non-processor circuits may include, but are not limited to, a radio receiver, a radio transmitter, signal drivers, clock circuits, power source circuits, and user input devices. As such, these functions may be interpreted as steps of a method to perform the authentication of an electronic device as a secure electronic device or trusted electronic device prior to entering any personal user credentials. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide devices, methods, and systems that allow a person to pick up an electronic device that is not theirs, such as a smartphone, tablet computer, laptop computer, or other electronic device, and verify that it is a secure electronic device free of malware, viruses, ransomware, hardware modifications, or other adulterations that may put the person's personal information at risk. Advantageously, embodiments of the disclosure allow the person to authenticate the electronic device as a secure electronic device prior to entering any personal information on the electronic device, thereby allowing them to be certain that any personal information entered into the electronic device will not be used for nefarious purposes.

Illustrating by example, using the devices, methods, and systems of the present disclosure, a person could enter a hotel room where the hotel provides a complimentary guest computer or tablet computer, and verify that the complimentary device was sound and virus and malware free prior to entering any user credentials, application credentials, or personal information. In short, embodiments of the disclosure allow the person to confirm that the electronic device is as trustworthy as if it was their own personal device before entering any personal information to enroll on the third-party electronic device. Thus, as people are surrounded by more and more electronic devices, embodiments of the disclosure allow people to be able to use these devices as if they were their own without fear of having their personal credentials, accounts, data, and identities compromised.

In one or more embodiments, an electronic device configured in accordance with embodiments of the disclosure is initially certified as being secure by the manufacturer. Alternatively, in other embodiments, a third party, such as a standards organization or quality control group, certifies that the electronic device is secure, i.e., is free from compromised hardware, viruses, malware, phishing applications or code, "man-in-the-middle" applications or code, malicious structured query language (SQL) code, DNS tunneling code, ransomware, or other digital maladies, prior to its being sold to a purchaser. In one or more embodiments, when or before this certification occurs, a secret key is programmed into an encrypted memory of the electronic device. In one or more embodiments, the certification of the electronic device as being secure involves testing the secret key in the encrypted memory to ensure it is valid and is programmed as expected.

Thereafter, when a person wishes to authenticate the electronic device as a secure electronic device, the user delivers a request to do the same to a user interface of the electronic device. The electronic device then transmits, with a communication device, the request to authenticate the electronic device as a secure electronic device to a remote electronic device across a network. In one or more embodiments, the remote electronic device is a cloud server. In other embodiments, the remote electronic device can be a generic server, computer, or other electronic device configured to validate and authenticate electronic devices as being secure.

In one or more embodiments, in response to receiving the request to authenticate the electronic device as a secure electronic device or trusted electronic device, the cloud server or other device challenges the electronic device by testing the secret key stored in the encrypted memory. For example, the cloud server or other device can deliver a security challenge to the electronic device being authenticated. In one or more embodiments, cloud server or other device references a secret key table as a function of a device identifier of the electronic device being authenticated and sends, as the security challenge, a message to which the answer is a function of the secret key stored in the encrypted memory.

In one or more embodiments, one or more processors of the electronic device then obtain a response to the security challenge using the secret key stored in the encrypted memory. The one or more processors then cause the communication device of the electronic device to transmit the response to the security challenge to the cloud server or other electronic device.

If the device is secure, i.e., if the response to the security challenge matches that which is expected by the cloud server or other electronic device due to its knowledge of the secret key, in one or more embodiments the cloud server then transmits to the electronic device a shared content marker, such as a picture, audio file, video file, graphic, or other identifier known only to the person attempting to authenticate the electronic device. The communication device of the electronic device receives the shared secret content marker. The one or more processors of the electronic device then present the shared secret content marker at the user interface. For example, of the shared secret content marker is a picture, the one or more processors of the electronic device present the picture on a display in one or more embodiments. By seeing the shared secret content marker, the person understands that the electronic device is a secure electronic device, understanding that they can trust the electronic device before entering any user credentials or other personal information.

Said differently, if the cloud server authenticates the electronic device as a secure electronic device by challenging the secret key stored in the encrypted memory of the electronic device, the cloud server then sends a shared secret content marker stored in the cloud server and known to the person attempting to authenticate the electronic device as a secure electronic device. If there is no authentication, the electronic device will not receive the shared secret content marker. The person knows to trust the electronic device as a secure electronic device only if they see (or hear) the shared secret content marker. This prevents a nefarious device from tricking the person into entering personal information, credentials, or identifiers, which are then acquired by a cyber villain.

In an alternate embodiment, a companion electronic device can be coupled to the electronic device being authenticated, thereby simplifying the process for the user. In one or more embodiments, the companion electronic device includes a communication interface, which can be a physical communication interface such as a connector. In other embodiments, the communication interface is a wireless communication interface. One or more processors of the companion electronic device are operable with the communication interface. The companion electronic device can optionally include a user authentication device, which can be a fingerprint sensor, keypad, imager, depth sensor, or other device.

In one or more embodiments, when the companion electronic device is operatively coupled with electronic device that needs to be authenticated as a secure electronic device, such as a public computer kiosk, the one or more processors of the companion electronic device are actuated by power received from the electronic device being authenticated through the communication interface when the communication interface establishes electronic communication with the electronic device being authenticated. If, for example, the communication interface is a physical communication interface, such as a universal serial bus (USB) connector, in one or more embodiments the one or more processors of the companion electronic device are actuated by power received from the universal serial bus connector when the universal serial bus connector is coupled to the electronic device being authenticated as the secure electronic device. In another embodiment, where the communication interface of the companion electronic device is a wireless communication interface, the one or more processors of the companion electronic device can be actuated by wireless power received from the communication interface when electronic communication is established with the electronic device being authenticated, and so forth.

In one or more embodiments, upon establishing electronic communication with the electronic device being authenticated, a communication device of the companion electronic device automatically delivers, to the communication interface, a request for a remote electronic device to authenticate the electronic device as a secure electronic device. As before, the electronic device being authenticated, in response to receiving the request to authenticate the electronic device as a secure electronic device or trusted electronic device, receives a security challenge from a cloud server or other electronic device.

One or more processors of the electronic device being authenticated then obtain a response to the security challenge using the secret key stored in an encrypted memory of the electronic device. The one or more processors of the electronic device being authenticated then cause the communication device to transmit the response to the security challenge to the cloud server or other electronic device, as previously described.

If the electronic device being authenticated is secure, i.e., if the response to the security challenge matches that which is expected by the cloud server or other electronic device due to its knowledge of the secret key, in one or more embodiments the one or more processors of the companion electronic device then retrieve a companion electronic device identifier and deliver it to the electronic device being authenticated for delivery to the cloud server. The cloud server then transmits to the electronic device being authenticated a shared secret. In one or more embodiments, the shared secret is a function of another secret key stored within an encrypted memory of the cloud server. Upon receiving this shared secret, the one or more processors of the companion electronic device then determine whether the shared secret matches an expected shared secret stored in the encrypted memory of the companion electronic device.

Where the shared secret received from the cloud server by the companion electronic device via the electronic device matches the expected shared secret stored in the encrypted memory of the companion electronic device, in one or more embodiments the companion electronic device delivers, with its communication device to the electronic device being authenticated, one or more user credentials stored in the encrypted memory of the companion electronic device, which may allow access to one or more applications, user files, user data, and so forth. In one or more embodiments, since the electronic device being authenticated is confirmed as being secure, the communication device of the companion electronic device can deliver, to the electronic device being authenticated, a request for the electronic device to display a content marker at a user interface of the electronic device indicating that the electronic device is secure. By seeing the shared secret content marker, the person understands that the electronic device is a secure electronic device, understanding that they can trust the electronic device before entering any user credentials or other personal information.

Advantageously, embodiments of the disclosure provide an electronic device that has a secret key programmed in an encrypted memory at the time of manufacturing. In one or more embodiments, the secret key is known to a cloud-based service that is configured to, upon request, authenticate the electronic device as a secure, authentic, unadulterated, or otherwise trusted electronic device. In one or more embodiments, this cloud-based service authenticates the electronic device as a secure electronic device by challenging the secret key. When the cloud-based service authenticates the electronic device as a secure electronic device, in one or more embodiments the cloud-based service sends a response expected by the person requesting authentication, i.e., a shared secret content marker for presentation on a user interface of the electronic device being authenticated, so that the person understands that the electronic device is indeed a secure electronic device.

In other embodiments, to streamline and make the process more efficient, a companion electronic device can be plugged into—or wirelessly coupled to—an electronic device. In one or more embodiments, one or more processors of the companion electronic device then cause the electronic device to which it is coupled, or in communication, to authenticate itself as a secure electronic device. Upon authentication as a secure electronic device, in one or more embodiments the companion electronic device then sends credentials to the electronic device to enable device usage for the person. Illustrating by example, the one or more processors of the companion electronic device can then automatically deliver, from an encrypted memory upon confirming that the electronic device is a secure electronic device, one or more user preferences enabling one or more functions of the other electronic device. In one or more embodiments, the companion electronic device is configured as a small, handheld companion electronic device that a person can conveniently carry in a pocket, on a lanyard around their neck, or attached to a bracelet.

The companion electronic device can deliver one or more user-preferred settings to the electronic device, user data, user information, and user preferences that the electronic device can use to configure the electronic device for use by the person. The companion electronic device can also deliver virtual private network communication preferences and credentials for communication with other electronic devices across a network, ringtone preferences, font size preferences, screen brightness preferences, audio setting preferences, call handling preferences, data handling preferences, application suite preferences, or other information.

Turning now to FIG. 1, illustrated therein is one explanatory method 100 in accordance with one or more embodiments of the disclosure. Beginning at step 101, an electronic device 109, shown illustratively as a smartphone, is initially in an unconfigured and/or uncustomized state. While shown illustratively as a smartphone, it should be noted that the electronic device 109 could be any number of electronic devices, including a laptop computer, a tablet computer, a desktop computer, a gaming device, a voice assistant device, a smart television, an Internet-of-Things (IoT) device, or other type of electronic device. Other examples of electronic devices suitable for use with embodiments of the disclosure will be obvious to those of ordinary skill in the art having the benefit of this disclosure.

The electronic device 109 may be in the unconfigured and/or uncustomized state, for example, if it is a publicly available device that is intended for multiple users. For example, a public library or school may have a series of such electronic devices for their patrons or students to use while visiting the library. Similarly, a hotel or airport may make such electronic devices available for their customers to use to check electronic mail, surf the Internet, or read the news.

When in the unconfigured and/or uncustomized state, the electronic device 109 may be configured to only perform generic functions using generic applications, and without user specific data. When in the unconfigured and/or uncustomized state, generic functions such as telephone applications, text messaging applications, web browsing applications, and so forth may be fully operational. However, they are considered to be "unconfigured" or "uncustomized" due to the fact that user preferences, such as a particular person's preferred contact list of numbers for the telephone application, a particular person's history of exchanged text messages for the text messaging application, or a particular person's browsing history, bookmark, and open tabs for the web browsing application are not available or accessible by any of these applications. Thus, a guest user using a generic function may be able to navigate to a particular website, e.g., the home page of Buster's Bluesmen with their new album, Mac's Boogie Woogie. However, to do so they would need to either know the uniform resource locator (URL) of Buster's page, or else find it in a search engine due to the fact that no bookmarks are stored in the web browsing application in its generic state.

Despite being in an unconfigured or uncustomized state, embodiments of the disclosure contemplate that, during usage by a particular person, the electronic device 109 could be customized with various user-specific data, applications, or other information. Illustrating by example, a cloud server 110 or other remote electronic device may be configured to deliver one or more user preferences to the electronic device 109. In one or more embodiments, the one or more user preferences enable one or more functions of the electronic device 109. For example, the one or more user preferences can comprise an application suite defining a plurality of applications that should be downloaded and installed on the electronic device 109 while the person is using the electronic device 109. Accordingly, delivering these one or more user preferences to the electronic device 109 would cause the application suite to be downloaded and installed, thereby enabling these new applications as new functions of the electronic device 109.

However, before delivering any personal information, identification information, authentication credentials, login credentials, or other information to the electronic device 109, embodiments of the disclosure contemplate that the user may want to ensure that the electronic device 109 has not been compromised by any software or hardware that could potentially capture this personal information and forward it on to a nefarious actor. For example, the person may want to confirm that the electronic device 109 is free of malware, viruses, ransomware, hardware modifications, or other hardware or software adulterations that may put the person's personal information at risk.

To perform such an authentication, at step 102 the person 111 delivers to a user interface of the electronic device 109, shown illustratively as a touch-sensitive display 112 in FIG. 1, a request 113 to authenticate the electronic device 109 as a secure electronic device or trusted electronic device. At step 102, the electronic device 109 receives 114, at the user interface, the request to authenticate the electronic device 109 as a secure electronic device or trusted electronic device. At step 102, the electronic device 109 transmits 115, with a communication device, the request 113 to authenticate the electronic device 109 as a secure electronic device or trusted electronic device to a remote electronic device across a network 116. In this illustrative embodiment, the remote electronic device is shown as a cloud server 110 in communication with the communication device of the electronic device 109 across the network 116. While shown as a cloud server 110, the remote electronic device could take other forms as well, including that of a generic server, computer, or other electronic device configured to validate and authenticate the electronic device 109 as being secure. At step 103, a communication device of the cloud server 110 receives the request 113 to authenticate the electronic device 109 as a secure electronic device or trusted electronic device.

As shown at step 104, in one or more embodiments, the electronic device 109 comprises a secret key 117 stored in an encrypted memory 118. In one or more embodiments, the secret key 117 comprises a manufacturer-programmed key that is programmed into the encrypted memory 118 during the manufacture of the electronic device 109. Embodiments of the disclosure that the manufacturer of the electronic device 109 can be initially certify the electronic device 109 as being a secure electronic device or trusted electronic device at the time of manufacture in one or more embodiments. Alternatively, in other embodiments, a third party, such as a standards organization or quality control group, can be responsible for certifying that the electronic device 109 is secure or trusted.

As used herein, a "secure" or "trusted" electronic device means one that will not forward data or information downloaded to, or entered into, the electronic device to parties unauthorized to access such data or information. Accordingly, in one or more embodiments a secure electronic device would be free from compromised hardware, viruses, malware, phishing applications or code, "man-in-the-middle" applications or code, malicious SQL code, DNS tunneling code, ransomware, or other digital maladies.

In one or more embodiments, when or before this certification occurs, the secret key 117 is programmed into the encrypted memory 118 of the electronic device 109. Embodiments of the disclosure contemplate that publicly available devices, such as the electronic device 109 at step 101, may not be trustworthy. People can program them with all sorts of software meant to capture user credentials for exploitation or profit. Accordingly, the method 100 of FIG. 1 advantageously allows the person 111 to know whether the electronic device 109 can be trusted prior to entering any personal information to enroll on the electronic device 109.

In one or more embodiments, this authentication of the electronic device 109 as a secure or trusted electronic device involves the cloud server 110 testing the secret key 117 in the encrypted memory 118 to ensure it is valid and is programmed as expected. In one or more embodiments, the cloud server 110 references a secret key table that includes a copy of the secret key 117 stored in the encrypted memory 118 corresponding to a device identifier of the electronic device 109. The cloud server 110 can then send a security challenge 120, which in one embodiment is a message to which the answer is a function of the secret key 117 stored in the encrypted memory 118 of the electronic device 109.

Illustrating by example, at step 104 the electronic device 109 receives, with its communication device from the cloud server 110, a security challenge 120. In one or more embodiments, the security challenge 120 requires a response 121 that can only be generated by accessing the secret key 117 stored in the encrypted memory 118. The security challenge 120 may be a code, for example, that must be returned in a hashed state using the secret key 117 in the hash function. When the cloud server 110 also has a copy of the secret key 117, the cloud server 110 will expect a certain hashed message to be returned of the secret key 117 of the electronic device 109 is authentic and has not been altered.

Accordingly, in one or more embodiments at step 104, the electronic device 109 receives 119 a security challenge from the cloud server 110. In one or more embodiments, step 104 comprises the electronic device 109 obtaining, a response 121 to the security challenge 120 using the secret key 117 stored in the encrypted memory 118 and transmitting 122 the response 121 to the security challenge 120 to the cloud server 110.

In one or more embodiments, if the cloud server 110 determines from the response 121 to the security challenge 120 at decision 105 that the electronic device 109 is secure, i.e., if the response 121 to the security challenge 120 matches that which is expected by the cloud server 110 due to its knowledge of the secret key 117 at decision 105, in one or more embodiments the cloud server 110 then transmits 123 to the electronic device 109 a shared secret content marker 124 at step 107. Otherwise, where the cloud server 110 determines at decision 105 that the electronic device 109 is not secure and/or has been compromised, communication between the cloud server 110 and the electronic device 109 terminates at step 106.

In one or more embodiments, the shared secret content marker 124 comprises something that, when presented to the person 111 on the user interface of the electronic device 109, will be recognized as being an indicator that only the person 111 would know. For example, the shared secret content marker 124 can comprise an image, an audio file, a video file, a visual graphic, or other identifier known only to the person 111 attempting to authenticate the electronic device 109. The shared secret content marker 124 can comprise one or more audio signals that are emitted by one or more loudspeakers of the electronic device 109 in one embodiment.

In one or more embodiments, where the shared secret content marker 124 comprises one or more graphical images 125, such as is the illustrative example at step 107, one or more processors of the electronic device 109 can present the shared secret content marker 124 to the person 111 at the user interface of the electronic device 109. In this example, step 107 comprises the one or more processors of the electronic device 109 displaying the one or more graphical images 125 on the display 112 of the electronic device 109. In one or more embodiments, the shared secret content marker 124 identifies that the electronic device 109 is a secure electronic device. For example, by seeing the shared secret content marker 124, which in this example is a cartoon of a cute dog with the message, "we're secure, dude," the person 111 instantly understands that the electronic device 109 is a secure electronic device. The person 111 thus understands that they can trust the electronic device 109 before entering any user identification credentials 126 or other personal information at step 108.

In this illustrative embodiment, one or more processors of the electronic device 109 request 127 that the person 111 enter user identification credentials 126 at the user interface by prompting the person 111 to enter biometric data to a fingerprint sensor using the display 112. One or more processors of the electronic device 109 then receive, at step 108, the user identification credentials 126. The one or more processors then cause the communication device to transmit the user identification credentials 126 to the cloud server 110.

Thus, in one or more embodiments the method 100 of FIG. 1 allows the cloud server 110 to authenticate the electronic device 109 as a secure electronic device by challenging the secret key 117 stored in the encrypted memory 118 of the electronic device 109. In one or more embodiments, when this occurs, the cloud server 110 then sends a shared secret content marker 124 stored in the cloud server 110 and known to the person 111 attempting to authenticate the electronic device 109 as a secure electronic device. If there is no authentication, the electronic device 109 will not receive the shared secret content marker. Instead, communication ceases at step 106. However, the person 111 knows to trust the electronic device as a secure electronic device only if they see (or hear) the shared secret content marker 124, such as is the case at step 107. This prevents a nefarious device from tricking the person 111 into entering personal information, credentials, or identifiers, which are then acquired by a cyber villain.

Other operations can be performed after the cloud server 110 authenticates the electronic device 109 as a secure electronic device and the person 111 enters user identification credentials 126 at step 108. For example, in one or more embodiments the cloud server 110 can deliver one or more user preferences to the electronic device 109. In one or more embodiments, the one or more user preferences enable one or more functions of the electronic device 109. For example, the one or more user preferences can comprise a variety of data suitable for configuring the electronic device 109 to the personal tastes of the person 111 while the person 111 is using the electronic device 109. When the person 111 is finished using the electronic device 109, the electronic device 109 can be "wiped" of personal information, thereby returning it to the uncustomized and/or unconfigured state of step 101, thus making the electronic device 109 ready for use by the next person.

However, while the person 111 is using the electronic device 109, the one or more user preferences can comprise one or more user-preferred settings for one or more functions of the electronic device 109. This can include data and files belonging to the person 111, other information belonging to the person 111, and/or applications or an application suite preferred by the person 111.

The one or more user preferences can comprise virtual private network communication preferences and credentials with which the electronic device 109 can communicate with other electronic devices across a network. The one or more user preferences can include additional user preference information such as ringtone preferences, font size preferences, screen brightness preferences, audio setting preferences, call handling preferences, data handling preferences, application suite preferences, or other information. The one or more user preferences can include a list of preferred electronic devices to which the electronic device 109 can connect, preferred power modes of operation for the electronic device 109, preferred authorized user authenticating technologies that should be used by the electronic device 109, e.g., voice recognition, fingerprint sensor, facial recognition, and so forth, preferred presence scanning duty cycles to detect whether the person 111 is still using the electronic device 109 prior to the electronic device 109 entering a low-power or sleep mode, preferred methods of connection to cloud services for the electronic device 109, and so forth.

The one or more user preferences can also include subscriber identification module information that can be loaded into an eSIM module of the electronic device 109, thereby allowing the electronic device 109 to transmit and receive voice calls, transmit and receive text messages, and otherwise use data from a subscription plan purchased by the person 111. The one or more user preferences can also comprise credentials to access services in the "cloud." For example, the one or more user preferences can comprise credentials to allow the electronic device 109 to access to accounts, application, data, and services stored at the cloud server 110. These examples of one or more user preferences are illustrative only. Numerous others will be obvious to those of ordinary skill in the art having the benefit of this disclosure.

Thus, the method 100 of FIG. 1 allows the person 111 to first verify that the electronic device 109 is a secure electronic device, and then to transform the electronic device 109 into a device that is configured and/or customized with the one or more user preferences of the person 111. The electronic device 109 can thus be enabled with one or more functions, e.g., installed applications, new privacy settings, new communication connectivity channels, new user data presentation settings, new ringtones, new power operating mode settings, and so forth, that it did not have at step 101. In one or more embodiments, this configuration occurring occurs automatically, and without any additional input from the person 111 beyond the delivery of the user identification credentials 126 at step 108.

The method 100 of FIG. 1 can be used in a variety of settings. Illustrating by example, if the electronic device 109 is a new device recently purchased from the manufacturer, using the method 100 of FIG. 1 the person 111 need only verify that the electronic device 109 is a secure electronic device to quickly and conveniently configure and customize the electronic device 109. In another application, the person 111 can confirm that a multi-user or public device is secure for personal content, data, and applications as if it was their own electronic device. If in an airport, for example, a public smartphone can easily be authenticated as one that will not steal the person's personal information. Other beneficial and amazing uses for the method 100 of FIG. 1 will be obvious to those of ordinary skill in the art having the benefit of this disclosure.

Figure 2:
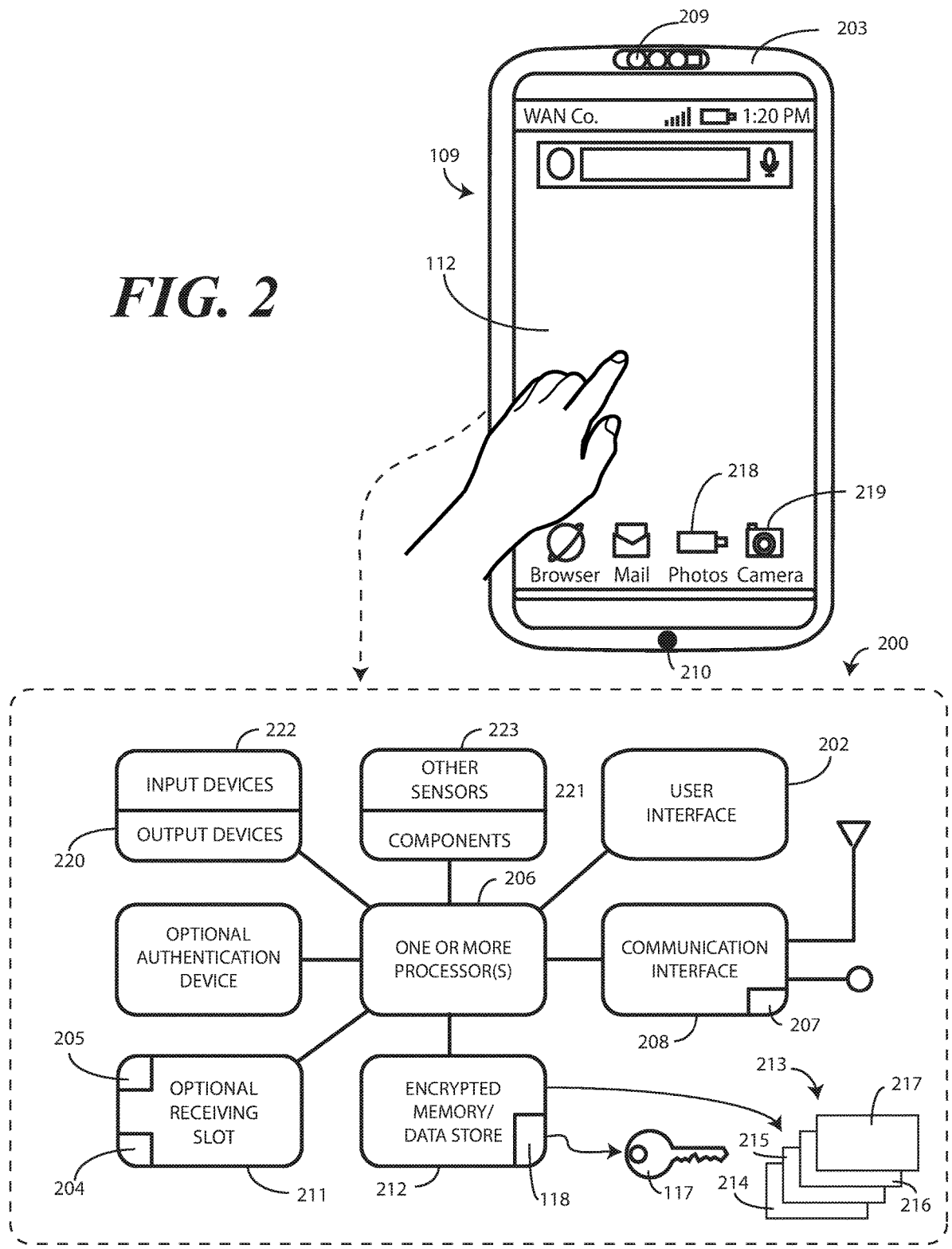
FIG. 2 illustrates one explanatory electronic device in accordance with one or more embodiments of the disclosure.

Turning now to FIG. 2, illustrated therein is a more detailed view of the explanatory electronic device 109 of FIG. 1. The electronic device 109 of this illustrative embodiment includes a display 112, which may optionally be touch-sensitive. The display 112 can serve as a primary user interface 202 of the electronic device 109. Where, touch sensitive, users can deliver user input to the display 112 of such an embodiment by delivering touch input from a finger, stylus, or other objects disposed proximately with the display. In one embodiment, the display 112 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 109 of FIG. 2 includes a housing 203. Features can be incorporated into the housing 203. Examples of such features include an optional companion electronic device receiving slot 204, which can be used in accordance with some embodiments, such as that described below with reference to FIG. 7. In other embodiments, the companion electronic device receiving slot 204 will be omitted. Where included, the companion electronic device receiving slot 204 can mechanically receive, and electrically couple to, a companion electronic device (described with reference to FIG. 6 below). Where included, the companion electronic device receiving slot 204 can optionally include a connector 205 with which one or more processors 206 of the electronic device 109 can communicate with a companion electronic device by sending and receiving electrical signals to a corresponding connector of the companion electronic device in one or more embodiments. In other embodiments, communication between the electronic device 109 and a companion electronic device can occur via wireless communication, such as via an optional near field communication circuit 207 or via a wireless communication channel established between the companion electronic device and the communication device 208 of the electronic device 109.

Other examples of features that can be included along the housing 203 include an imager 209, shown as a camera in FIG. 2, or an optional speaker port. A user interface component 210, which may be a button or touch sensitive surface, can also be disposed along the housing 203. The user interface component 210 may be used to actuate an optional ejection mechanism 211 configured to decouple and detach the companion electronic device from the electronic device 109.

A block diagram schematic 200 of the electronic device 109 is also shown in FIG. 2. In one embodiment, the electronic device 109 includes one or more processors 206. In one embodiment, the one or more processors 206 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the electronic device 109. Each of the application processor and the auxiliary processor(s) can be configured to process and execute executable software code to perform the various functions of the electronic device 109. A storage device, such as memory 212, can optionally store the executable software code used by the one or more processors 206 during operation.

In this illustrative embodiment, the electronic device 109 also includes a communication device 208 that can be configured for wired or wireless communication with one or more other devices or networks. The networks can include a wide area network, a local area network, and/or personal area network. The communication device 208 may also utilize wireless technology for communication, such as, but are not limited to, peer-to-peer, or ad hoc communications such as HomeRF, Bluetooth and IEEE 802.11 based communication, or alternatively via other forms of wireless communication such as infrared technology. The communication device 208 can include wireless communication circuitry, one of a receiver, a transmitter, or transceiver, and one or more antennas.

The electronic device 109 can optionally include a near field communication circuit 207 used to exchange data, power, and electrical signals between the electronic device 109 and a companion electronic device. In one embodiment, the near field communication circuit 207 is operable with a wireless near field communication transceiver, which is a form of radio-frequency device configured to send and receive radio-frequency data to and from the companion electronic device or other near field communication objects.

Where included, the near field communication circuit 207 can have its own near field communication circuit controller in one or more embodiments to wirelessly communicate with companion electronic devices using various near field communication technologies and protocols. The near field communication circuit 207 can include—as an antenna—a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data, power, or other communication signals with companion electronic devices.

In one embodiment, the one or more processors 206 can be responsible for performing the primary functions of the electronic device 109. For example, in one embodiment the one or more processors 206 comprise one or more circuits operable to present presentation information, such as images, text, and video, on the display 112. The executable software code used by the one or more processors 206 can be configured as one or more modules 213 that are operable with the one or more processors 206. Such modules 213 can store instructions, control algorithms, and so forth.

In one embodiment, the one or more processors 206 are responsible for running the operating system environment 214. The operating system environment 214 can include a kernel, one or more drivers, and an application service layer 215, and an application layer 216. The operating system environment 214 can be configured as executable code operating on one or more processors or control circuits of the electronic device 109.

The application service layer 215 can be responsible for executing application service modules. The application service modules may support one or more applications 217 or "apps." Examples of such applications include a cellular telephone application for making voice telephone calls, a web browsing application configured to allow the user to view webpages on the display 112 of the electronic device 109, an electronic mail application configured to send and receive electronic mail, a photo application configured to organize, manage, and present photographs on the display 112 of the electronic device 109, and a camera application for capturing images with the imager 209. Collectively, these applications constitute an "application suite."

In one or more embodiments, these applications are operable either in a generic mode or a customized mode. For example, populating the photo application 218 with the photographs of a person using the electronic device 109 enables a new function in the electronic device 109 by allowing the one or more processors 206 of the electronic device 109 to present information that was not presentable when the photo application 218 was operating in a generic mode. In the generic mode, the photo application may only be able to present photographs captured by the camera application 219 captured when the camera application 219 is operating in the generic mode, for example.

In one or more embodiments, the user interface 202 is operable to receive a request (113) to authenticate the electronic device 109 as a secure electronic device. In one or more embodiments, the communication device 208 is operable to transmit the request (113) to authenticate the electronic device 109 as a secure electronic device to a remote electronic device, such as a cloud server (110), across a network (116). In one or more embodiments, the communication device 208 is further operable to receive, from the remote electronic device, a security challenge (120), as previously described.

In one or more embodiments, the one or more processors 206 then obtain a response (121) to the security challenge (120) using a secret key 117 stored in an encrypted memory 118 of the electronic device 109. In one or more embodiments, the secret key 117 comprises a manufacturer-programmed key that is programmed into the encrypted memory 118 during the manufacture of the electronic device 109. In one or more embodiments, the one or more processors 206 then cause the communication device 208 to transmit the response (121) to the security challenge (120) to the remote electronic device.

In one or more embodiments, the communication device 208 then receives, from the remote electronic device, a shared secret content marker (124). In one or more embodiments, the shared secret content marker (124) identifies that the electronic device 109 is a secure electronic device, as previously described.

When this occurs, in one or more embodiments the one or more processors 206 are operable to present, on the user interface 202, the shared secret content marker (124). For example, where the shared secret content marker (124) comprises one or more graphical images (125), the one or more processors 206 can cause the one or more graphical images (125) to be displayed on the display 112 of the electronic device 109. By contrast, where the shared secret content marker (124) comprises one or more audio signals, the one or more processors 206 may present the shared secret content marker (124) by emitting the one or more audio signals by one or more loudspeakers 220 of the electronic device 109.

In one or more embodiments, the one or more processors 206 can request, at the user interface 202, for a person to enter user identification credentials (126). For example, the one or more processors 206 may prompt, using the display 112, for the user to enter biometric information, a password, a personal identification number (PIN), or other information. In one or more embodiments, when the one or more processors 206 receive these user identification credentials (126) at the user interface 202, they cause the communication device 208 to transmit the user identification credentials (126) to a remote electronic device.

In one or more embodiments, this transmission of the user identification credentials (126) causes a login event connecting the communication device 208 of the electronic device 109 to one or more cloud-based services across a network. This login event can cause the cloud-based services to customize the electronic device 109 for the user's use. Illustrating by example, the login event can cause personal photographs to be retrieved for presentation by the photos application 218.

Similarly, the login event can enable another functions, such as by altering the application suite operating on the electronic device 109. In the example of FIG. 2, only four applications are shown operating on the electronic device 109 when the electronic device 109 is operating in the generic mode. In one or more embodiments, the login event can cause additional applications, which are not stored on the electronic device 109 when operating in the generic mode, to be downloaded and operable and become operable when the electronic device 109 has been authenticated as secure electronic device and the user identification credentials (126) have cause the login event at the cloud-based services. Other examples of how the electronic device 109 can be customized in response to being authenticated as a secure electronic device will be obvious to those of ordinary skill in the art having the benefit of this disclosure.

In one or more embodiments, the one or more processors 206 are responsible for managing the applications and all personal information received after the electronic device 109 is authenticated as a secure electronic device and the user identification credentials (126) have triggered the cloud-based login event. The one or more processors 206 can also be responsible for launching, monitoring and killing the various applications and the various application service modules. In one or more embodiments, the one or more processors 206 are operable to not only kill the applications customized by the cloud-based services once the person logs out of either the cloud-based services or from the electronic device 109, but also to expunge any and all personal data, data, files, settings, or other configuration tools received from the cloud-based services into the memory 212 to wipe the memory 212 clean of any personal data, preferences, or settings of the person previously using the electronic device 109.

The one or more processors 206 can also be operable with other components 221. The other components 221, in one embodiment, include input components 222, which can include acoustic detectors as one or more microphones. The one or more processors 206 may process information from the other components 221 alone or in combination with other data, such as the information stored in the memory 212 or information received from the user interface.

The other components 221 can include a video input component such as an optical sensor, another audio input component such as a second microphone, and a mechanical input component such as button. The other components 221 can include one or more sensors 223, which may include key selection sensors, touch pad sensors, capacitive sensors, motion sensors, and switches. Similarly, the other components 221 can include video, audio, and/or mechanical outputs.

The one or more sensors 223 may include, but are not limited to, accelerometers, touch sensors, surface/housing capacitive sensors, audio sensors, and video sensors. Touch sensors may used to indicate whether the electronic device 109 is being touched at side edges. The other components 221 of the electronic device can also include a device interface to provide a direct connection to auxiliary components or accessories for additional or enhanced functionality and a power source, such as a portable battery, for providing power to the other internal components and allow portability of the electronic device 109.

It is to be understood that FIG. 2 is provided for illustrative purposes only and for illustrating components of one electronic device 109 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
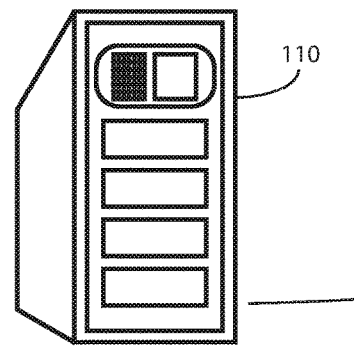
FIG. 3 illustrates one explanatory cloud device in accordance with one or more embodiments of the disclosure.
Figure 3:
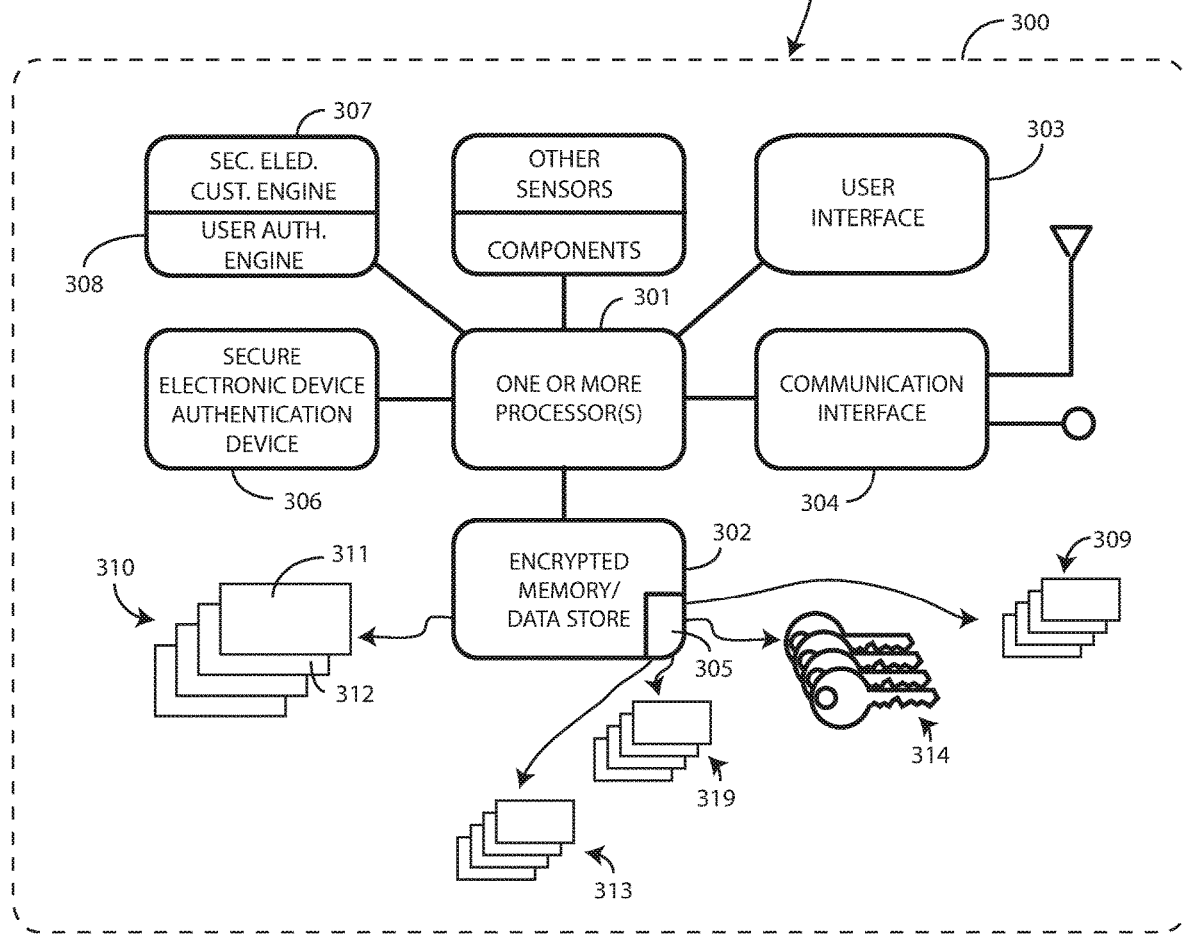

Turning now to FIG. 3, illustrated therein is one remote electronic device with which the electronic device (109) of FIG. 2 may communicate across a network. The remote electronic device is illustrated as a cloud server 110 in FIG. 3. However, in other embodiments, the remote electronic device can be another type of computer, server, a server complex, network hub, or other computing device configured to authenticate one or more electronic devices as secure or trusted electronic devices.

An illustrative schematic block diagram 300 is also shown in FIG. 3. As with the block diagram schematic (200) of FIG. 2, it is to be understood that the schematic block diagram 300 of FIG. 3 is provided for illustrative purposes only and for illustrating components of one explanatory cloud server 110 configured in accordance with one or more embodiments of the disclosure. Accordingly, the components shown in either FIG. 2 or FIG. 3 are not intended to be complete schematic diagrams of the various components required for a particular device, as other devices configured in accordance with embodiments of the disclosure may include various other components not shown in FIG. 2 or FIG. 3. Alternatively, other remote electronic devices configured in accordance with embodiments of the disclosure or may include a combination of two or more components or a division of a particular component into two or more separate components, and still be within the scope of the present disclosure.

In one or more embodiments the cloud server 110 can be configured for performing processor-intensive methods, operations, steps, functions, or procedures associated with authenticating an electronic device as a secure electronic device and, optionally, configuring the electronic device thereafter with user preferred settings and configurations in response to receiving user identification credentials. In one or more embodiments, the cloud server 110 includes one or more processors 301, one or more memory devices 302, and one or more user interface devices 303, e.g., a display, a keyboard, a mouse, audio input devices, audio output devices, and alternate visual output devices. The cloud server 110 also includes a communication device 304. These components can be operatively coupled together such that, for example, the one or more processors 301 are operable with the one or more memory devices 302, the one or more user interface devices 303, and/or the communication device 304 in one or more embodiments.

The one or more processors 301 can include a microprocessor, a group of processing components, one or more ASICs, programmable logic, or other type of processing device. The one or more processors 301 can be configured to process and execute executable software code to perform the various functions of the cloud server 110.

The one or more memory devices 302 can optionally store the executable software code used by the one or more processors 301 in carrying out the operations of authenticating electronic devices as secure or trusted electronic devices. The one or more memory devices 302 may include either or both of static and dynamic memory components, as well as one or more encrypted memory devices 305. The one or more memory devices 302 can store both embedded software code and user data. The software code can embody program instructions and methods to operate the various functions of the terminal device, and also to execute software or firmware applications and modules such as the secure electronic device authentication engine 306, the secure electronic device customization engine 307, and the user authentication engine 308.

In one or more embodiments, the communication device 304 comprises any of a number of wired or wireless technologies for communication. Examples of these technologies include wired plain old telephone service (POTS) technologies, wired Ethernet technologies such as those configured in accordance with the IEEE 802 networking standards, peer-to-peer or ad hoc communications, frequency modulated communication, amplitude modulated communication, or IEEE 802.11 wireless communication. Other forms of communication technologies suitable for inclusion with the communication device 304 will be obvious to those having the benefit of this disclosure. The communication device 304 can include wired or wireless communication circuitry, one of a receiver, a transmitter, or transceiver. Where wireless, the communication device 304 can include one or more antennas.

In one or more embodiments, the communication device 304 is operable to establish electronic communication with an electronic device (109) across a network (116). In one or more embodiments, the communication device 304 is operable to receive a request (113) to authenticate an electronic device (109) as a secure electronic device.

In one or more embodiments, upon the communication device 304 receiving the request (113) to authenticate an electronic device (109) as a secure electronic device, the one or more processors 301 generate a security challenge (120). Thereafter, in one or more embodiments the communication device 304 can transmit the security challenge (120) to the electronic device (109). In one or more embodiments, the communication device 304 then receives a response (121) to the security challenge (120) from the electronic device (109). In one or more embodiments, the response (121) to the security challenge (120) is a function of a secret key (117) stored in an encrypted memory (118) of the electronic device (109).

In one or more embodiments, the one or more processors 301 can then determine whether the response (121) to the security challenge (120) received from the electronic device (109) matches an expected response 310 that is a function of the secret key (117) assigned to the electronic device (109). Illustrating by example, in one or more embodiments the electronic device (109) can send, along with the response (121) to the security challenge (120) one or more user identification credentials (126). In another embodiment described below with reference to FIG. 5, the electronic device (109) can send, along with the response (121) to the security challenge (120), a companion electronic device identifier.

The one or more processors 301 can then determine, depending upon which is received, whether the companion electronic device identifier matches an expected companion device identifier 311 or, alternatively, whether the one or more user identification credentials (126) match one or more expected user identification credentials 312. Where they do, i.e., where the companion electronic device identifier matches the expected companion device identifier 311 or the one or more user identification credentials (126) match the one or more expected user identification credentials 312, in one or more embodiments the one or more processors 301 obtain, from the encrypted memory 305, a shared secret 319. Thereafter, the communication device 304 can transmit the shared secret 319 to the electronic device (109). In one or more embodiments, the shared secret 319 comprises a shared secret content marker (124).

Where the one or more processors 301 of the cloud server 110 are in communication with a companion electronic device, as will be the case with reference to FIG. 5 below, i.e., where the remote electronic device is a companion electronic device rather than, for example, the electronic device (109) of FIG. 2, additional steps can be performed. For example, in one or more embodiments when the one or more processors 301 are communicating with a companion electronic device via the communication device 304, the one or more processors 301 may obtain, from the encrypted memory 305 a security message 313 that is a function of another shared key 314 stored within the encrypted memory 305. Thereafter, the communication device 304 can transmit the security message 313 to the companion electronic device, as will be described in more detail below with reference to FIG. 7.

Figure 4:
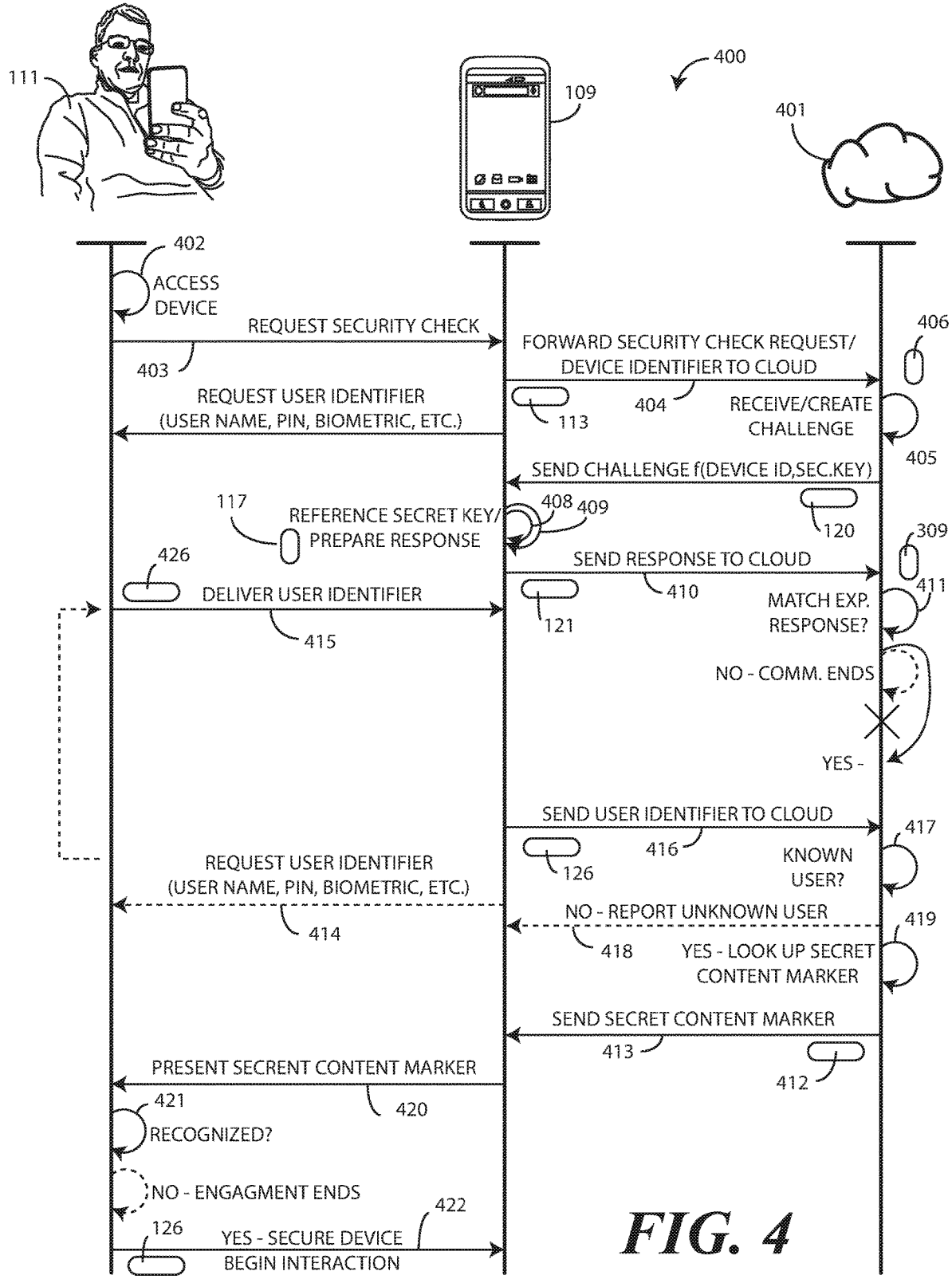
FIG. 4 illustrates one explanatory system diagram in accordance with one or more embodiments of the disclosure.

Turning now to FIG. 4, illustrated therein is one explanatory system 400 which includes a person 111 desiring to authenticate an electronic device 109 as a secure or trusted electronic device so that the person 111 can enter user identification credentials 126 to customize and use the electronic device 109 without fear of some nefarious actor spoofing or otherwise obtaining the user identification credentials 126. A remote electronic device, shown illustratively as one or more cloud services 401, which may comprise, employ, consist essentially of, or include a cloud server (110) or other electronic device, is operable to authenticate the electronic device 109 as a secure or trusted electronic device, as well as optionally to customize and/or configure the electronic device 109 for use.

Initially, the person 111 accesses 402 the electronic device 109. For instance, the person 111 access 402 the electronic device 109 by picking it up and turning it ON. In one or more embodiments, the electronic device 109 is in an unconfigured and/or uncustomized state when the person 111 initially accesses 402 the electronic device 109. The electronic device 109 may be, for example, a publicly available device that is intended for multiple users.

When in the unconfigured and/or uncustomized state, the electronic device 109 may be configured to only perform generic functions using generic applications, and without user specific data. Such generic functions may be "unconfigured" or "uncustomized" due to the fact that user preferences are not yet available or accessible by any of these applications.

After accessing the electronic device 109, before delivering any personal information, identification information, user identification credentials, authentication credentials, login credentials, or other information to the electronic device 109, the person 111 sends 403 a request 113 to authenticate the electronic device 109 as a secure electronic device or trusted electronic device to ensure that the electronic device 109 has not been compromised by any software or hardware that could potentially capture this personal information and forward it on to a nefarious actor. Advantageously, sending 403 this request 113 works to confirm that the electronic device 109 is free of malware, viruses, ransomware, hardware modifications, or other hardware or software adulterations that may put the person's personal information at risk.

Upon receiving this request 113, in one or more embodiments the electronic device 109 then forwards 404 the request 113 to authenticate the electronic device 109 as a secure electronic device to the cloud services 401. In one or more embodiments, the cloud services 401 then reference 405 a key table 406 that includes a list of identifiers of electronic devices with which the cloud services 401 are operable, as well as the secret keys stored within each electronic device. For example, in one or more embodiments the key table 406 would include an identifier of the electronic device (109), which is received along with the request 113 to authenticate the electronic device 109 as a secure electronic device or trusted electronic device, along with information regarding the secret key 117 stored in the encrypted memory (118) of the electronic device 109. After referencing the key table 405 to obtain the necessary key information for this particular electronic device 109, in one or more embodiments the cloud services 401 then send 407 a security challenge to the electronic device 109.

When the electronic device 109 receives the security challenge 120, in one or more embodiments it references 408 its secret key 117 stored in the encrypted memory (118) and generates 409 a response 121 to the security challenge 120. A communication device (208) of the electronic device 109 then transmits 410 the response 121 to the security challenge 120 to the cloud services 401.

The cloud services 401 then determine 411, upon receiving the response 121 to the security challenge 120, whether the response 121 to the security challenge 120 matches an expected response 309 that is a function of the secret key 117 assigned to the electronic device 109. Where it does not, communication between the cloud services 401 and the electronic device 109 end. However, where it does, i.e., where the response 121 to the security challenge 120 matches the expected response 309 that is a function of the secret key 117 assigned to the electronic device 109, in one or more embodiments the cloud services 401 obtain, from an encrypted memory, a shared secret 412. A communication device of the cloud services 401 then transmits 413 the shared secret 412 to the electronic device 109. In one or more embodiments, the shared secret 412 comprises a shared secret content marker (124).

Between determining whether the response 121 to the security challenge 120 matches the expected response 309 that is a function of the secret key 117 assigned to the electronic device 109, in one or more embodiments the electronic device 109 may prompt 414 the person 111 to enter a user identifier 426 at a user interface (202) of the electronic device 109. For example, one or more processors (206) of the electronic device 109 may prompt the person 111 for a user name and biometric input that allows the cloud services 401 to determine the identity of the person 111. In one or more embodiments, when the person provides the user identifier 426 to the user interface (202), a communication device (208) of the electronic device 109 transmits 415 the user identifier 426 to the cloud services 401.

In one or more embodiments, the cloud services 401 then determine 417 from the user identifier 426 whether the person 111 is a recognized user of the cloud services 401 who is authorized to use the cloud services 401. Where they are not, the cloud services 401 can optionally report 418 to the electronic device 109 that the person 111 is not a recognized user of the cloud services 401. One or more processors (206) of the electronic device 109 can then optionally repeat the prompting 414 of the person 111 to again enter the user identification credentials 126.

In one or more embodiments, when the person 111 is recognized as a user of the cloud services 401, the cloud services 401 can retrieve 419 a shared secret 412 corresponding to the person 111, selected as a function of the user identifier 426, and transmit 413 the shared secret 412 to the electronic device 109. As noted above, in one or more embodiments the shared secret 412 comprises a shared secret content marker (124). One or more processors (206) of the electronic device 109 can present 420 the shared secret 412 on a user interface (202) of the electronic device 109. Illustrating by example, the one or more processors (206) can speak, show, or play the shared secret 412 to the person 111.

The person 111 can then determine 421 whether the shared secret 412 is recognized as the one configured to identify the electronic device 109 as a secure electronic device or trusted electronic device. Where it does not, the person 111 simply terminates their interaction with the electronic device 109 to prevent the delivery of any user identification credentials 126 to the electronic device 109. However, when the person 111 recognizes the shared secret 412, the person 111 can enter one or more user identification credentials 126, which are transmitted to the electronic device 109 to enroll the person 111 at the electronic device 109 so the person 111 can interact 422 with the electronic device 109. The user identification credentials 126 can include a password, PIN, iris scan, facial scan, or other user identification credential.

Figure 5:
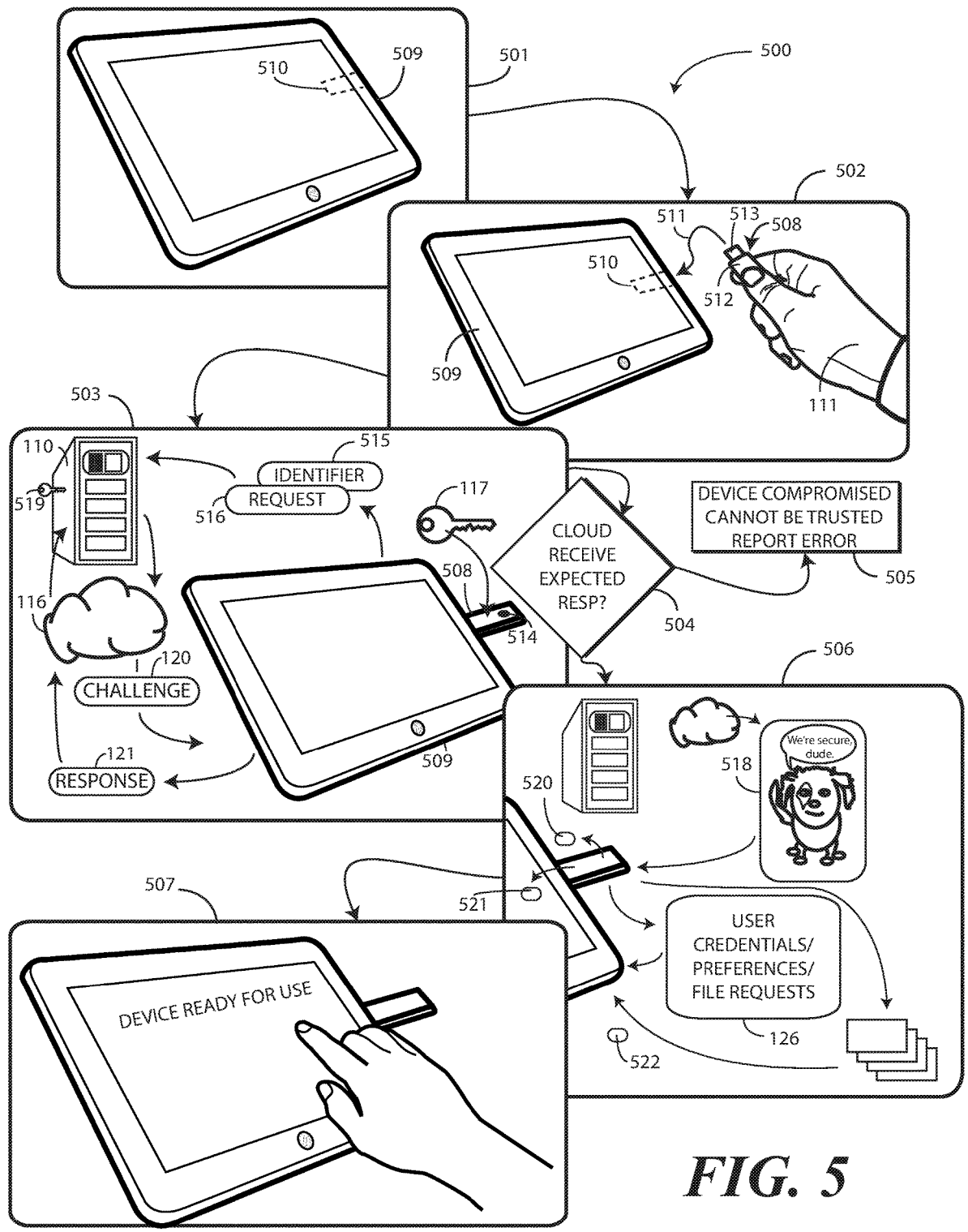
FIG. 5 illustrates another explanatory method in accordance with one or more embodiments of the disclosure.

Turning now to FIG. 5, illustrated therein is an alternate method 500 in accordance with one or more embodiments of the disclosure. Instead of manually delivering a request to authenticate an electronic device as a secure electronic device as in the method (100) of FIG. 1 above, in the method 500 of FIG. 5 a companion electronic device 508 automatically performs the various authentication steps for the person.

With the method 500 of FIG. 5, cloud services (represented here by a cloud server 110) still authenticate the electronic device 509 as a secure electronic device or trusted electronic device. However, the companion electronic device 508 delivers the request to authenticate, asking the cloud server 110 to respond with an expected message or content. If the cloud server 110 authenticates the electronic device 509 as a secure electronic device or trusted electronic device by sending the expected message or content to the companion electronic device 508, in one or more embodiments the companion electronic device 508 releases user identification credentials 126 to the electronic device 509. Advantageously, using the method 500 of FIG. 5, a person need not take any action other than watching to see whether the companion electronic device 508 allows the person to login or otherwise enroll to the electronic device 509.

Beginning at step 501, an electronic device 509, shown illustratively as a tablet computer, is initially in an unconfigured and/or uncustomized state. While shown illustratively as a tablet computer, it should be noted that the electronic device 509 could be any number of electronic devices, as noted above. In one or more embodiments, the electronic device 509 includes a schematic block diagram having one or more electronic components from the schematic block diagram of FIG. 2, as referenced by common reference designators in the description that follows.

At step 501, the electronic device 509 may be in the unconfigured and/or uncustomized state, for example, if it is a publicly available electronic device intended for use by many people, and having only generic functions and applications loaded and operable on the electronic device 509 until a particular person enrolls on the electronic device 509. The electronic device 509 may be a publicly available device in a public library or school, for example. Similarly, a hotel or airport may make such electronic devices available for their customers to use to check electronic mail, surf the Internet, or read the news.

In one or more embodiments, the electronic device 509 includes a communication interface 510 with which it can communicate with a companion electronic device. In the illustrative embodiment of FIG. 5, the communication interface 510 comprises a physical interface in the form of a companion electronic device receiver slot with a physical connector to which a companion electronic device 508 can be coupled. The physical connector of the communication interface 510 can take a variety of forms. For example, the physical connector of the communication interface 510 can be any of a universal serial bus connector, secure digital card interface, high-definition multimedia connector, serial peripheral interface (SPI) connector, inter-integrated circuit (I2C) connector, universal asynchronous receiver-transmitter (UART) connector, or other connector.

In other embodiments the communication interface 510 can be configured as a wireless communication interface without a physical connector. For example, the communication interface 510 can be configured as any of a near-field communication interface, a Wi-Fi interface, a Bluetooth interface, or other wireless interface. Other forms of communication interfaces will be obvious to those of ordinary skill in the art having the benefit of this disclosure.

At step 502 a person 111 attaches 511 a companion electronic device 508 to the communication interface 510 of the electronic device 509. In this illustrative embodiment, the companion electronic device 508 is configured as a small, handheld device that the person 111 can conveniently carry in a pocket, on a lanyard around their neck, or attached to a bracelet. In one or more embodiments, the companion electronic device 508 includes a housing 512. In this illustrative embodiment, since the communication interface 510 of the electronic device 509 comprises a physical interface with a connector, the companion electronic device 508 includes a complementary connector 513, which is a universal serial bus connector in this example, and which serves as a communication interface for the companion electronic device 508. As shown at step 502, the person 111 attaches 511 the companion electronic device 508 to the electronic device 509 by sliding the complementary connector 513 of the companion electronic device 508 into the connector of the communication interface 510 until the complementary connector 513 couples to the connector of the communication interface 510.

In one or more embodiments the companion electronic device 508 optionally includes an authentication device 514 that is carried by the housing 512 of the companion electronic device 508. In one or more embodiments, the authentication device 514 is operable with one or more processors of the companion electronic device 508. In this illustrative embodiment, the authentication device 514 comprises a fingerprint sensor, and is covered by the thumb of the person 111 at step 502, but is visible at step 503.

As will be described below with reference to FIG. 6, the authentication device 514 can take other forms as well. For example, in another embodiment the authentication device 514 can comprise an imager that performs facial recognition on the person 111. In another embodiment, the authentication device 514 comprises an audio input device that performs voice recognition on audio input received from the person 111. In still another embodiment, the authentication device 514 comprises a depth scanner that obtains a depth scan of a face of the person 111. In still other embodiments, the authentication device 514 can comprise a touchpad allowing the person 111 to enter a signature or personal identification number (PIN). Regardless of type, in one or more embodiments the authentication device 514 is configured to process authentication data received by the authentication device 514 to determine whether the authentication data is received from, or belongs to, an authorized user of the companion electronic device 508. The various authentication devices listed above are illustrative only, and can be used alone or in combination. Other examples of authentication devices will be obvious to those of ordinary skill in the art having the benefit of this disclosure.

As will also be described below with reference to FIG. 6, in one or more embodiments the companion electronic device 508 comprises one or more processors and an encrypted memory operable with the one or more processors. In one or more embodiments, the one or more processors are operable with the authentication device 514 as well.

In one or more embodiments, the one or more processors of the companion electronic device 508 receive power from the electronic device 509 when the companion electronic device 508 is coupled to the electronic device 509. Said differently, in one or more embodiments the one or more processors of the companion electronic device 508 receive power from the communication interface 510 of the electronic device 509 when the communication interface of the companion electronic device 508, which is the complementary connector 513 in this example, establishes electronic communication with one or more processors of the electronic device 509. Accordingly, at step 503, the one or more processors of the companion electronic device 508 are actuated by power received from the complementary connector 513 upon the complementary connector 513 establishing communication with the electronic device 509. Thus, step 503 comprises the one or more processors of the companion electronic device 508 receiving power at the complementary connector 513 that actuates the one or more processors of the companion electronic device 508 in one or more embodiments.

At step 503, a communication device of the companion electronic device 508 automatically, upon establishing electronic communication with the electronic device 509, delivers—by way of the electronic device 509 and its communication device (208)—a request 515 for a remote electronic device, here a cloud server 110, to authenticate the electronic device 509 as a secure electronic device or trusted electronic device. The communication device (208) of the electronic device 509 receives the request 515 for the cloud server 110 to authenticate the electronic device 509 as a secure electronic device or trusted electronic device from the companion electronic device 508 at step 503.

In this illustrative embodiment, the communication interface 510 of the electronic device 509 includes a physical connector. Accordingly, in this illustrative embodiment the communication device (208) of the electronic device 509 receives the request 515 for the cloud server 110 to authenticate the electronic device 509 as a secure electronic device or trusted electronic device from the companion electronic device 508 at a physical connector of the electronic device 509. In other embodiments, however, the electronic device 509 and companion electronic device 508 each include wireless communication interfaces. Accordingly, in such embodiments the communication device (208) of the electronic device 509 receives the request 515 for the cloud server 110 to authenticate the electronic device 509 as a secure electronic device or trusted electronic device from the companion electronic device 508 at a wireless interface of the electronic device 509.

In one or more embodiments, the request 515 to authenticate the electronic device 509 as a secure electronic device or trusted electronic device received from the companion electronic device 508 also includes a companion electronic device identifier 516 that identifies the companion electronic device 508 to the cloud server 110. Thus, in one or more embodiments step 503 further comprises the one or more processors of the companion electronic device 508 retrieving the companion electronic device identifier 516 from a memory of the companion electronic device 508 and delivering, with the communication device of the companion electronic device 508 to the communication device (208) of the electronic device 509, the companion electronic device identifier 516 for transmission by the electronic device 509 across the network 116 to the cloud server 110. The communication device (208) of the electronic device 509 receives the companion electronic device identifier 516 from the companion electronic device 508 at step 503.

The communication device (208) of the electronic device 509 then transmits, to the cloud server 110 across the network 116, the request 515 for the cloud server 110 to authenticate the electronic device 509 as a secure electronic device or trusted electronic device. At step 503, the cloud server 110 receives, with its communication device (304), the request 515 and, where included, the companion electronic device identifier 516.

At step 503, the cloud server 110 then sends, to the electronic device 509, a security challenge 120. At step 503, the communication device (208) of the electronic device 509 receives the security challenge 120 from the cloud server 110 across the network 116.

As before, in one or more embodiments the electronic device 509 includes a secret key 117 stored in an encrypted memory (118) of the electronic device 509. In one or more embodiments, one or more processors (206) of the electronic device 509 obtain a response 121 to the security challenge 120 using the secret key 117 stored within the encrypted memory (118) of the electronic device 509. The communication device (208) of the electronic device 509 then transmits this response 121 to the communication device (304) of the cloud server 110.

In one or more embodiments, if the cloud server 110 determines from the response 121 to the security challenge 120 at decision 504 that the electronic device 509 is secure, i.e., if the response 121 to the security challenge 120 matches that which is expected by the cloud server 110 due to its knowledge of the secret key 117 at decision 504, in one or more embodiments the cloud server 110 then transmits to the electronic device 509 a shared secret 518 for delivery to the companion electronic device 508. In one or more embodiments, the shared secret 518 is a function of another secret key 519 stored within an encrypted memory (305) of the cloud server 110. In one or more embodiments, the communication device (208) of the electronic device 509 then delivers the shared secret 518 to the companion electronic device 508. Otherwise, where the cloud server 110 determines at decision 504 that the electronic device 509 is not secure and/or has been compromised, communication between the cloud server 110 and the electronic device 509 terminates at step 505.

If the electronic device 509 is secure, one or more processors of the companion electronic device 508 then determine whether the shared secret 518 matches an expected shared secret 520 stored in an encrypted memory of the companion electronic device 508 based upon its knowledge of the secret key 519 stored in the encrypted memory (305) of the cloud server 110. Where the shared secret 518 matches the expected shared secret 520, thereby indicating that the cloud server 110 is recognized and that the electronic device 509 is secure, in one or more embodiments the communication device (208) of the electronic device 509 receives a determination 521 of this fact from the companion electronic device 508 at step 506.

Where the shared secret 518 comprises a shared secret content marker, in one or more embodiments the communication device (208) of the electronic device 509 can receive a request 522 for the electronic device 509 to display the shared secret content marker at a user interface (202) of the electronic device 509 to indicate to the person that the electronic device 509 is secure in one or more embodiments. This is optional, as in other embodiments the person will understand that the electronic device 509 is secure when they are automatically enrolled by the companion electronic device 508.

In one or more embodiments, when the shared secret 518 received from the cloud server 110 matches the expected shared secret 520 stored in the encrypted memory of the companion electronic device 508, the communication device (208) of the electronic device 509 can receive, from the companion electronic device 508, one or more user identification credentials stored 126 in the encrypted memory of the companion electronic device 508, thereby enrolling the person on the electronic device 509. The electronic device 509 is then ready for use, as shown at step 507.

Figure 6:
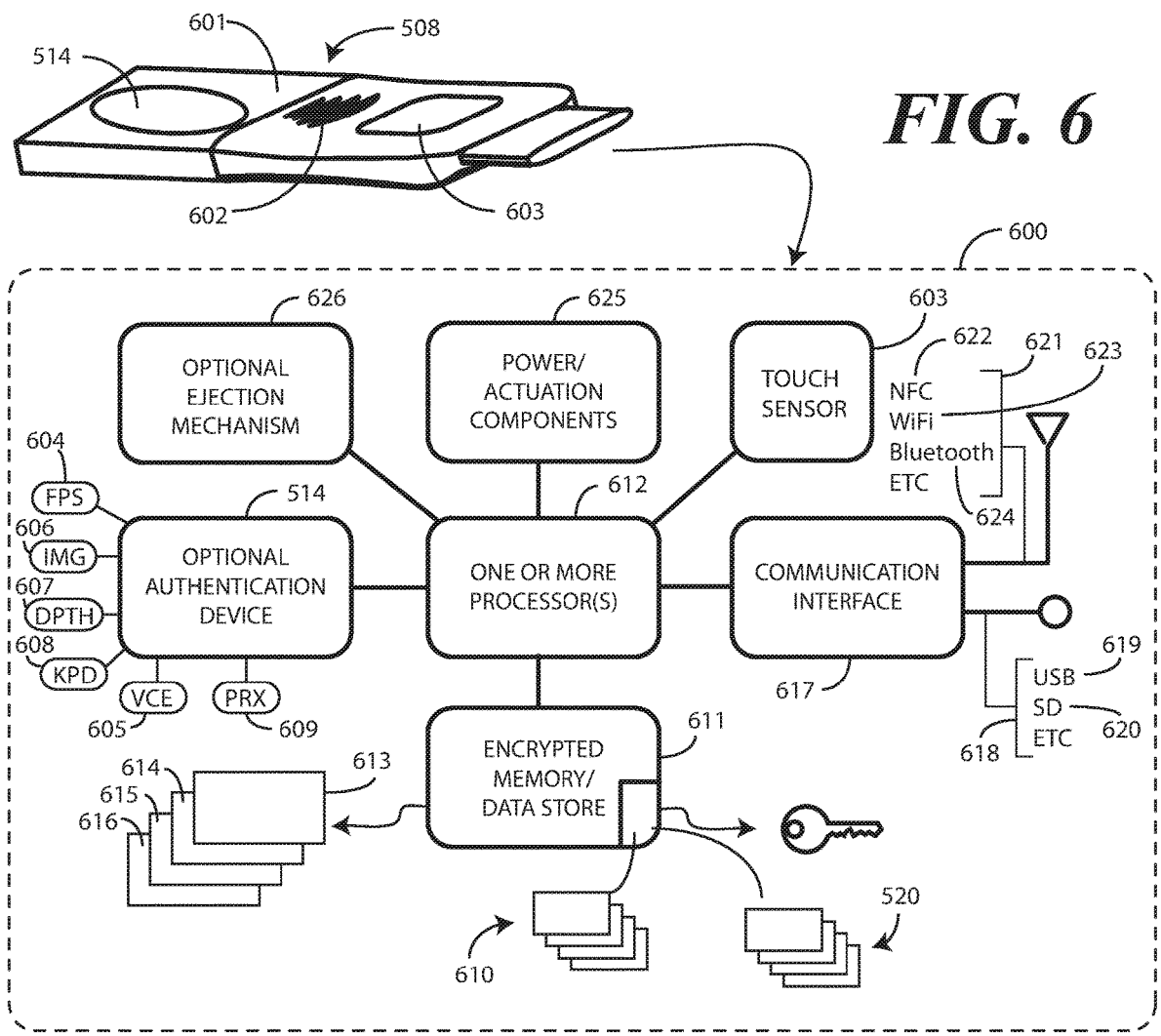
FIG. 6 illustrates explanatory companion electronic device in accordance with one or more embodiments of the disclosure.

Turning now to FIG. 6, illustrated therein is a block diagram schematic 600 of the companion electronic device 508 of FIG. 5. It should be noted that the block diagram schematic 600 of FIG. 6 is provided for illustrative purposes only and for illustrating components of one companion electronic device 508 in accordance with embodiments of the disclosure. The block diagram schematic of FIG. 6 is not intended to be a complete schematic diagram of the various components required for a companion electronic device 508.

Therefore, other companion electronic devices configured in accordance with embodiments of the disclosure may include various other components not shown in FIG. 6, or may include a combination of two or more components or a division of a particular component into two or more separate components, and still be within the scope of the present disclosure. A companion electronic device may have fewer, or different, components from another companion electronic device configured in accordance with embodiments of the disclosure. Accordingly, companion electronic devices configured in accordance with embodiments of the disclosure can include some components that are not shown in FIG. 6, and other components that are shown may not be needed and can therefore be omitted.

In one or more embodiments, the companion electronic device 508 comprises a housing 601. Features can be incorporated into the housing 601. In this illustrative embodiment, an authentication device 514 is disposed along a surface of the housing 601. In one embodiment, the authentication device 514 is responsible for authentication data received at the authentication device 514 to authenticate or otherwise identify a person as an authorized user of the companion electronic device 508. Other devices can be disposed along the housing 601 as well. Examples of such devices include ribs or finger grips 602 for gripping the companion electronic device 508 or an optional touch sensor 603 for detecting a person touching the housing 601 of the companion electronic device 508.

In one embodiment, the authentication device 514 comprises a biometric sensor. In one or more embodiments, the biometric sensor comprises a fingerprint sensor 604, as previously described. However, other types of biometric sensors that can be substituted for the fingerprint sensor 604 will be obvious to those of ordinary skill in the art having the benefit of this disclosure. For example, in other embodiments the biometric sensor can be a voice interface engine 605 of an audio input/processor.

The voice interface engine 605 can include hardware, executable code, and speech monitor executable code in one embodiment. The voice interface engine 605 can include, stored in the encrypted memory 611, basic speech models, trained speech models, or other modules that are used by the voice interface engine 605 to receive and identify a particular user's voice commands that are received with audio input captured by an audio input device, such as one or more microphones situated along the housing 601 of the companion electronic device 508. In one embodiment, the voice interface engine 605 performs voice recognition operations.

In another embodiment, the authentication device 514 can be an imager processor system. The imager processor system can be operable with sensors of the companion electronic device 508, such as a camera or imager 606, to identify the user through facial recognition techniques by capturing photographs of the user.

Where the authentication device 514 is configured as an imager processor system, the authentication device 514 can include one or more processors that are operable with one or more sensors. For example, in one or more embodiments the one or more sensors operable with the imager processor system \comprise one or more of the aforementioned imager 606, a depth imager 607, and, optionally, one or more proximity sensors 609.

In one embodiment, the imager 606 comprises a two-dimensional imager configured to receive at least one image of an environment about the companion electronic device 508. In one embodiment, the imager 606 comprises a two-dimensional Red-Green-Blue (RGB) imager. In another embodiment, the imager 606 comprises an infrared imager. Other types of imagers suitable for use as the imager 606 of companion electronic device 508 will be obvious to those of ordinary skill in the art having the benefit of this disclosure.

The one or more proximity sensors 609, where included, can take various forms. In one or more embodiments, the one or more proximity sensors 609 fall in to one of two camps: active proximity sensors and "passive" proximity sensors. Either the proximity detector components or the proximity sensor components can be generally used for detecting persons and/or present within the environment, distances between warm objects and the companion electronic device 508, changes in distance between warm objects and the companion electronic device, and other information.

As used herein, a "proximity sensor component" comprises a signal receiver only that does not include a corresponding transmitter to emit signals for reflection off an object to the signal receiver. A signal receiver only can be used due to the fact that a user's body or other heat generating object external to the companion electronic device 508 serves as the transmitter. In one embodiment, the signal receiver is an infrared signal receiver to receive an infrared emission from a source, such as a human being, when the human being is approaching the companion electronic device 508.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment, the one or more proximity sensors 609 simply comprise a proximity sensor component. In another embodiment, the one or more proximity sensors 609 comprise a simple thermopile. In another embodiment, the one or more proximity sensors 609 comprise an infrared imager that captures the amount of thermal energy emitted by an object. In still other embodiments, the one or more proximity sensors 609 comprise a proximity detector component. Of course, combinations of these components can be used as the one or more proximity sensors 609. Moreover, other types of proximity sensors suitable for use with the companion electronic device 508 will be obvious to those of ordinary skill in the art having the benefit of this disclosure.

As with the one or more proximity sensors 609, the depth imager 607, where included, can take a variety of forms. In a first embodiment, the depth imager 607 comprises a pair of imagers separated by a predetermined distance, such as three to four images. This "stereo" imager works in the same way the human eyes do in that it captures images from two different angles and reconciles the two to determine distance.

In another embodiment, the depth imager 607 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 607 comprises a time of flight device. Time of flight three-dimensional sensors emit laser or infrared pulses and received reflections/image to a photodiode array. These pulses reflect back from a surface, such as the user's face. The time it takes for pulses to move from the photodiode array to the surface and back determines distance, from which a three-dimensional mapping of a surface can be obtained.

In one or more embodiments where the authentication device 514 is configured as an imager processor system, it can function as one or both of a face analyzer and/or an environmental analyzer. Where so configured, the authentication device 514 can be configured to process an image or depth scan of an object and determine whether the object matches predetermined criteria by comparing the image or depth scan to one or more predefined authentication references stored in the encrypted memory 611.

In one or more embodiments, the authentication device 514 can determine whether a person is an authorized user of the companion electronic device 508. In one or more embodiments, the authentication device 514 can employ optical and/or spatial recognition to identify persons or objects using image recognition, character recognition, visible recognition, facial recognition, color recognition, shape recognition, and the like. Advantageously, in one or more embodiments the authentication device 514 can be used as a facial recognition device and/or companion electronic device recognition device in one or more embodiments.

In one or more embodiments, one or both of the imager 606 and/or the depth imager 607 can capture a photograph and/or depth scan of a person. The authentication device 514 can then compare the image and/or depth scan to one or more predefined authentication references 610 stored in the encrypted memory 611. With respect to a person, this comparison, in one or more embodiments, is used to confirm beyond a threshold authenticity probability that the person's face—both in the image and the depth scan—sufficiently matches one or more of the predefined authentication references 610 stored in the encrypted memory 611 for the authentication device 514 to identify the person as being an authorized user of the companion electronic device 508.

In another embodiment, the authentication device 514 can be something other than a biometric sensor. For example, in another embodiment the authentication device 514 can be a user interface device 608, such as a keypad or touch screen, with which a user can enter authentication data. For example, in one embodiment the authentication device 514 comprises a user interface device allowing a person to enter a password or personal identification number (PIN) to authenticate his or her self as the authorized user of the companion electronic device 508. Other examples of authentication devices suitable for use in the companion electronic device 508 will be obvious to those of ordinary skill in the art having the benefit of this disclosure.

Where the authentication device 514 is configured as a fingerprint sensor 604, in one or more embodiments it includes its own processor to perform various functions, including detecting a finger touching the fingerprint sensor 604, capturing and storing fingerprint data from the finger, and optionally identifying or authenticating a user based upon the fingerprint data. In one or more embodiments the processor of the fingerprint sensor 604 can, as one preprocessing step, perform a preliminary authentication of the user by comparing fingerprint data captured by the fingerprint sensor 604 to a reference file stored in the encrypted memory 611, while secondary authentication is performed by the one or more processors 612. The processor of the fingerprint sensor 604 can be an on-board processor. Alternatively, the processor can be a secondary processor that is external to, but operable with, the fingerprint sensor in another embodiment. Other configurations will be obvious to those of ordinary skill in the art having the benefit of this disclosure.

In one embodiment, the fingerprint sensor 604 can include a plurality of sensors. The fingerprint sensor 604 can be a complementary metal-oxide-semiconductor active pixel sensor digital imager or any other fingerprint sensor. The fingerprint sensor 604 can be configured to capture, with the plurality of sensors, a live scan of a fingerprint pattern from a finger disposed along its surface, and to store this information as fingerprint data from the user's finger. The fingerprint sensor 604 may also be able to capture one or more images with the plurality of sensors. The images can correspond to an area beneath a surface of skin. The fingerprint sensor 604 can compare the fingerprint data or skin images to one or more references to authenticate a user in an authentication process. While the fingerprint sensor 604 is disposed along a top surface of the housing 601 in this illustration, it should be noted that it could alternatively be disposed along the bottom surface of the housing 601 or on the sides of the housing in other embodiments.

The companion electronic device 508 includes one or more processors 612. The one or more processors 612 can be operable with the various components of the companion electronic device 508. The one or more processors 612 can be configured to process and execute executable software code to perform the various functions of the companion electronic device 508. A storage device, such as the encrypted memory 611, can optionally store the executable software code used by the one or more processors 612 during operation.

In one or more embodiments, the encrypted memory 611 can store one or more user preferred settings 613, one or more user identification credentials 614, one or more user preferred configurations 615, and/or user data 616 belonging to an authorized user of the companion electronic device 508. In one or more embodiments, the one or more processors 612 are configured to automatically deliver, from the encrypted memory 611 upon the one or more processors 612 of the companion electronic device 508 determining that the electronic device to which the companion electronic device 508 is connected is a secure electronic device or trusted electronic device, which occurs in one or more embodiments when the one or more processors 612 receive a shared secret (518) that matches an expected shared secret 520 stored in the encrypted memory 611, and further upon the authentication device 514 confirming that received authentication data was received from an authorized user of the companion electronic device 508, the one or more user preferred settings 613, the one or more user identification credentials 614, one or more user preferred configurations 615, and/or user data 616 to the communication interface 617 of the companion electronic device 508. In one or more embodiments, one or more of the one or more user preferred settings 613, the one or more user identification credentials 614, one or more user preferred configurations 615, and/or user data 616 enable one or more functions of the electronic device receiving the one or more user preferred settings 613, the one or more user identification credentials 614, the one or more user preferred configurations 615, and/or user data 616 so long as power is being delivered to the one or more processors 612 of the companion electronic device 508 through the communication interface 617.

The communication interface 617 can take a variety of forms. Illustrating by example, in one or more embodiments the communication interface 617 is a physical interface 618. In one or more embodiments, the physical interface 618 comprises a universal serial bus connector 619. In other embodiments, the physical interface 618 comprises a secure digital (SD) card interface 620. Other examples of physical interfaces for the communication interface 617 will be obvious to those of ordinary skill in the art having the benefit of this disclosure. For example, the physical interface 618 can comprise a high-definition multimedia connector or other connector to which the companion electronic device can be coupled to another electronic device.

In other embodiments, the communication interface 617 comprises a wireless interface 621. In one or more embodiments, the wireless interface 621 comprises a near-field communication interface 622. In another embodiment, the wireless interface 621 comprises a wireless fidelity interface 623. In still other embodiments, the communication interface 617 comprises a Bluetooth interface 624. Other examples of wireless interfaces will be obvious to those of ordinary skill in the art having the benefit of this disclosure. For example, in another embodiment the wireless interface 621 comprises an ad hoc or peer-to-peer interface.

In one or more embodiments, the communication interface 617 establishes electronic communication with an electronic device to which the companion electronic device 508 is coupled. In one or more embodiments, the communication interface 617 also receives power from the electronic device to which the companion electronic device 508 is coupled. In one or more embodiments, this power received from the other electronic device through the communication interface 617 is used to actuate and power the one or more processors 612 of the companion electronic device 508, as well as the other components operable with the one or more processors 612. Power conversion/storage circuitry 625 can be included to buffer and/or process the received power used by the one or more processors 612 of the companion electronic device 508.

In one or more embodiments, the companion electronic device 508 comprises an optional ejection mechanism 626 configured to facilitate decoupling and detachment of the companion electronic device 508 from another the electronic device. Illustrating by example, in one or more embodiments the touch sensor 603 is configured to be operable with the ejection mechanism 626 such that the ejection mechanism 626 detects an ejection event when a person touches the housing 601 of the companion electronic device.

Figure 7:
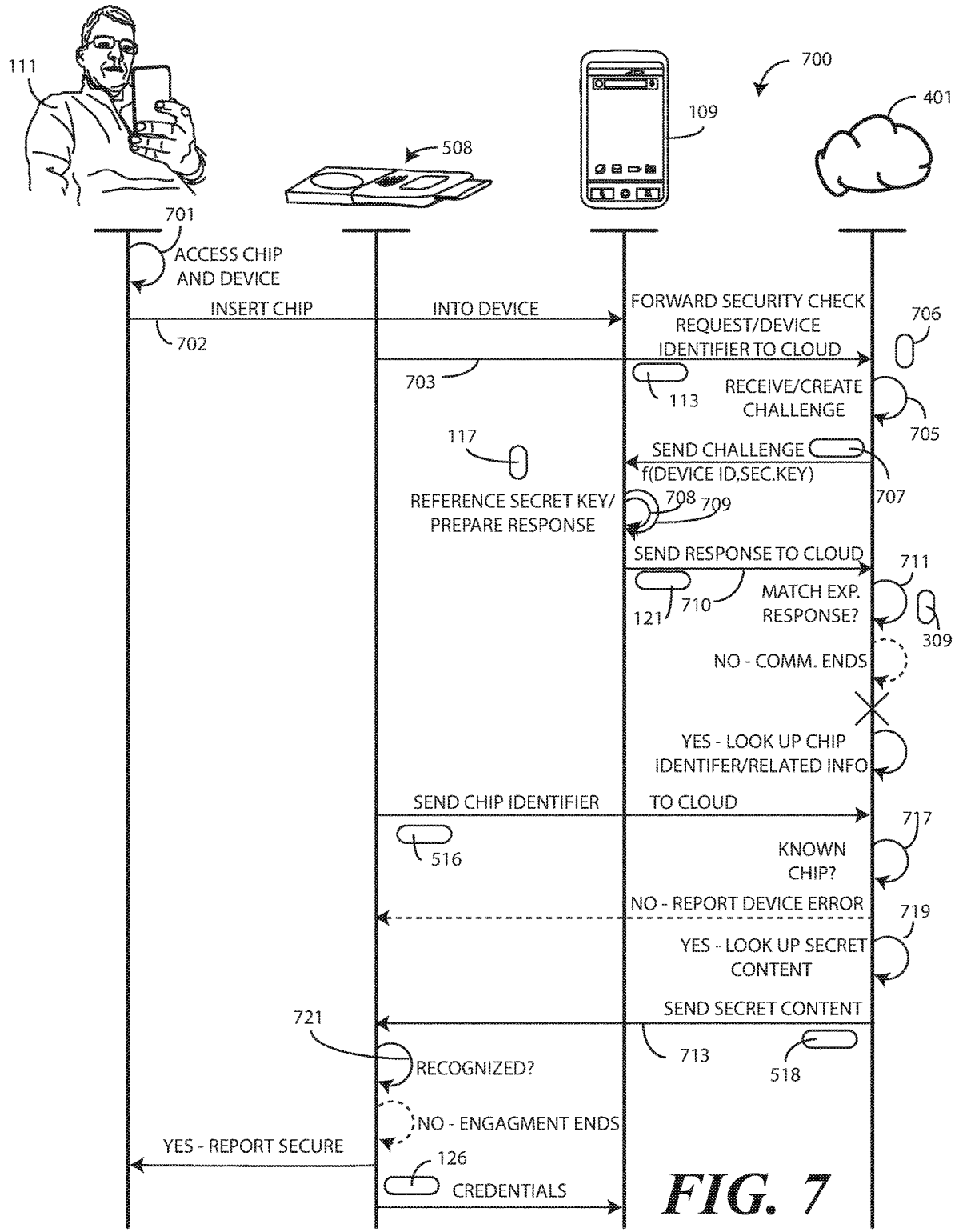
FIG. 7 illustrates another explanatory system diagram in accordance with one or more embodiments of the disclosure.

Turning now to FIG. 7, illustrated therein is an alternate system 700 which includes a person 111 desiring to authenticate an electronic device 109 as a secure or trusted electronic device so that the person 111 can be enrolled at the electronic device 109 without fear of some nefarious actor spoofing or otherwise obtaining the user identification credentials 126 belonging to the person 111. A remote electronic device, shown illustratively as one or more cloud services 401, which may comprise, employ, consist essentially of, or include a cloud server (110) or other electronic device, is operable to authenticate the electronic device 109 as a secure or trusted electronic device, as well as optionally to customize and/or configure the electronic device 109 for use.

Initially, the person 111 accesses 701 the electronic device 109. For instance, the person 111 access 701 the electronic device 109 by picking it up and turning it ON. In one or more embodiments, the electronic device 109 is in an unconfigured and/or uncustomized state when the person 111 initially accesses 701 the electronic device 109. The electronic device 109 may be, for example, a publicly available device that is intended for multiple users.

When in the unconfigured and/or uncustomized state, the electronic device 109 may be configured to only perform generic functions using generic applications, and without user specific data. Such generic functions may be "unconfigured" or "uncustomized" due to the fact that user preferences are not yet available or accessible by any of these applications.

After accessing the electronic device 109, in one or more embodiments the person 111 then connects 702 a companion electronic device 508 to the electronic device 109. In one or more embodiments, this connection 702 occurs before the person 111 provides any personal information, identification information, user identification credentials, authentication credentials, login credentials, or other information to the electronic device 109.

In one or more embodiments, upon being connected 702 to the electronic device 109, the companion electronic device 508 automatically sends 703, using the electronic device 109, a request 113 to authenticate the electronic device 109 as a secure electronic device or trusted electronic device to ensure that the electronic device 109 has not been compromised by any software or hardware that could potentially capture this personal information and forward it on to a nefarious actor. Advantageously, automatically sending 703 this request 113 works to confirm that the electronic device 109 is free of malware, viruses, ransomware, hardware modifications, or other hardware or software adulterations that may put the person's personal information at risk.

Upon receiving this request 113, in one or more embodiments the cloud services 401 then reference 705 a key table 706 that includes a list of identifiers of electronic devices with which the cloud services 401 are operable, as well as the secret keys stored within each electronic device. For example, in one or more embodiments the key table 706 would include an identifier of the electronic device 109, which is received along with the request 113 to authenticate the electronic device 109 as a secure electronic device or trusted electronic device, along with information regarding the secret key 117 stored in the encrypted memory (118) of the electronic device 109. After referencing the key table 705 to obtain the necessary key information for this particular electronic device 109, in one or more embodiments the cloud services 401 then send 707 a security challenge 120 to the electronic device 109.

When the electronic device 109 receives the security challenge 120, in one or more embodiments it references 708 its secret key 117 stored in the encrypted memory (118) and generates 709 a response 121 to the security challenge 120. A communication device (208) of the electronic device 109 then transmits 710 the response 121 to the security challenge 120 to the cloud services 401.

The cloud services 401 then determine 711, upon receiving the response 121 to the security challenge 120, whether the response 121 to the security challenge 120 matches an expected response 309 that is a function of the secret key 117 assigned to the electronic device 109. Where it does not, communication between the cloud services 401 and the electronic device 109 ends. However, where it does, i.e., where the response 121 to the security challenge 120 matches the expected response 309 that is a function of the secret key 117 assigned to the electronic device 109, in one or more embodiments the cloud services 401 obtain, from an encrypted memory, a shared secret 518. A communication device (304) of the cloud services 401 then transmits 713 the shared secret 518 to the electronic device 109. In one or more embodiments, the shared secret 518 comprises a shared secret content marker (124).

Between determining whether the response 121 to the security challenge 120 matches the expected response 309 that is a function of the secret key 117 assigned to the electronic device 109, in one or more embodiments the companion electronic device 508 provides a companion electronic device identifier 516 to the cloud services 401. In one or more embodiments, the cloud services 401 then determine 717, from the companion electronic device identifier 516, whether the companion electronic device 508 is a companion electronic device of the cloud services 401. Where they are not, the cloud services 401 can optionally report an error to the electronic device 109 indicating that the companion electronic device 508 is unrecognized or that an error has occurred.

In one or more embodiments, when the companion electronic device 508 is recognized by the cloud services 401, the cloud services 401 can retrieve 719 a shared secret 518 that should be expected by one or more processors (612) of the companion electronic device 508 and transmit 713 the shared secret 518 to the electronic device 109 for delivery to the companion electronic device 508.

One or more processors (612) of the companion electronic device 508 can then determine 721 whether the shared secret 518 matches an expected shared secret (520) stored in an encrypted memory (611) of the companion electronic device 508. Where it does not, the companion electronic device 508 simply terminates interaction with the electronic device 109 to prevent the delivery of any user identification credentials 126 to the electronic device 109. However, when the shared secret 518 matches the expected shared secret (520), in one or more embodiments the one or more processors (612) of the companion electronic device 508 automatically release and deliver one or more user identification credentials 126 to the electronic device 109 to enroll the person 111 at the electronic device 109.

Figure 8:
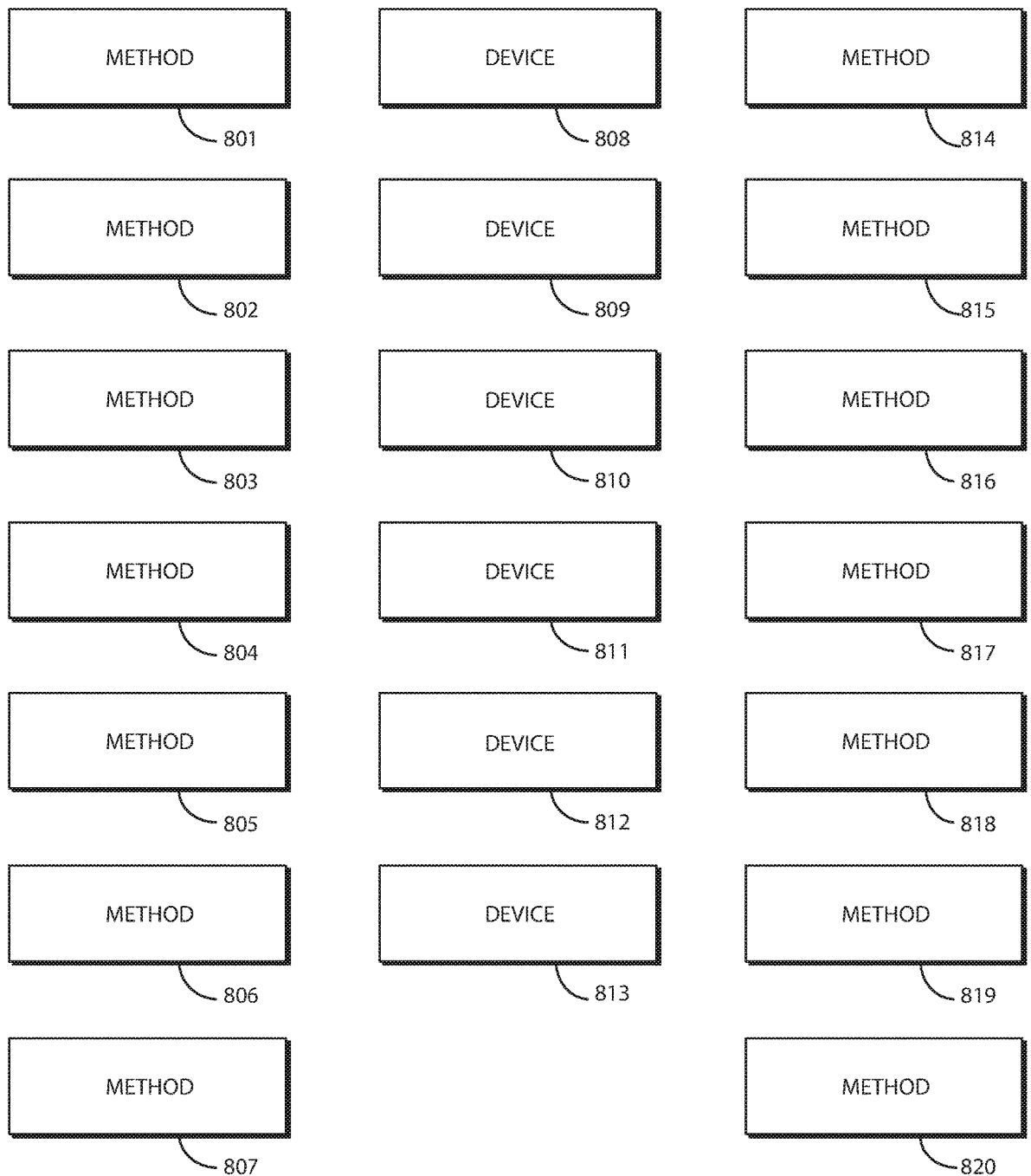
FIG. 8 illustrates various embodiments of the disclosure.

Turning now to FIG. 8, illustrated therein are one or more embodiments of the disclosure. At 801, a method in an electronic device comprises receiving, at a user interface of the electronic device, a request to authenticate the electronic device as a secure electronic device. At 801, the method comprises transmitting, with a communication device, the request to authenticate the electronic device to a remote electronic device across a network.

At 801, the method comprises receiving, with the communication device from the remote electronic device, a security challenge. At 801, the method comprises obtaining, with one or more processors, a response to the security challenge using a secret key stored in an encrypted memory of the electronic device. At 801, the method comprises transmitting the response to the response to the security challenge to the remote electronic device. At 802, the secret key of 801 comprises a manufacturer-programmed key programmed into the encrypted memory during the manufacture of the electronic device.

At 803, the method of 801 further comprises receiving, with the communication device from the remote electronic device, a shared secret content marker. At 803 the method comprises presenting, with the one or more processors on the user interface, the shared secret content marker.

At 804, the shared secret content marker of 803 comprises one or more graphical images. At 804, the presenting of 803 comprises displaying the one or more graphical images on a display of the electronic device.

At 805, the shared secret content marker of 803 comprises one or more audio signals. At 805, the presenting of 803 comprises emitting the one or more audio signals by one or more loudspeakers of the electronic device. At 806, the shared secret content marker of 803 identifies that the electronic device is the secure electronic device.

At 807, the method of 803 further comprises requesting, by the one or more processors at the user interface, user identification credentials. At 807, the method of 803 comprises receiving, by the one or more processors at the user interface, the user identification credentials. At 807, the method of 803 comprises transmitting, with the communication device to the remote electronic device, the user identification credentials.

At 808, an electronic device comprises a communication device in communication with a remote electronic device. At 808, the electronic device comprises one or more processors operable with the communication device. At 808, the electronic device comprises an encrypted memory operable with the one or more processors.

At 808, the communication device receives a request to authenticate the remote electronic device as a secure electronic device. At 808, the one or more processors generate a security challenge in response to receiving the request. At 808, the communication device transmits the security challenge to the remote electronic device and receives a response to the security challenge from the remote electronic device. At 808, the one or more processors determine whether the response to the security challenge from the remote electronic device matches an expected response to the security challenge that is a function of a secret key assigned to the remote electronic device.

At 809, the communication device of 808 also receives one of a companion electronic device identifier or one or more user identification credentials from the remote electronic device. At 810, the one or more processors of 809 determine whether the one of the companion electronic device identifier matches an expected companion device identifier or the one or more user identification credentials match one or more expected user identification credentials. At 810, where the one of the companion electronic device identifier matches the expected companion device identifier or the one or more user identification credentials match the one or more expected user identification credentials, the one or more processors obtain, from the encrypted memory, a shared secret, and cause the communication device to transmit the shared secret to the remote electronic device.

At 811, the shared secret of 810 comprises a shared secret content marker. At 812, the remote electronic device comprises a companion electronic device in communication with another electronic device. At 813, the one or more processors of 812 further obtain, from the encrypted memory, a security message that is a function of another shared key stored in the encrypted memory and cause the communication device to transmit the security message to the remote electronic device.

At 814 a method in an electronic device comprises receiving, with a communication device of the electronic device from a companion electronic device in electronic communication with the communication device, a request for a remote electronic device to authenticate the electronic device as a secure electronic device. At 814, the method comprises transmitting, with the communication device of the electronic device to the remote electronic device across a network, the request for the remote electronic device to authenticate the electronic device as the secure electronic device.

At 814, the method comprises receiving, with the communication device of the electronic device from the remote electronic device across the network, a security challenge. At 814, the method comprises obtaining, with one or more processors of the electronic device using a secret key stored in an encrypted memory of the electronic device, a response to the security challenge. At 814, the method comprises transmitting, with the communication device to the remote electronic device across the network, the response to the security challenge.

At 815, the receiving the request for the remote electronic device to authenticate the electronic device as the secure electronic device of 814 occurs at a physical connector of a communication interface of the electronic device. At 816, the method of 814 further comprises receiving, with the communication device of the electronic device from the companion electronic device, a companion electronic device identifier, and transmitting, with the communication device of the electronic device to the remote electronic device across the network, the companion electronic device identifier.

At 817, the method of 816 further comprises receiving, with the communication device of the electronic device from the remote electronic device across the network, a shared secret that is a function of another secret key stored within another memory of the remote electronic device. At 817, the method of 816 further comprises delivering, with the communication device of the electronic device to the companion electronic device, the shared secret.

At 818, the method of 817 further comprises receiving, with the communication device of the electronic device from the companion electronic device, a determination of whether the shared secret matches an expected shared secret stored in an encrypted memory of the companion electronic device. At 819, the method of 818 further comprises, when the shared secret received from the remote electronic device matches the expected shared secret stored in the encrypted memory of the companion electronic device, receiving, with the communication device of the electronic device from the companion electronic device, one or more user identification credentials stored in the encrypted memory of the companion electronic device. At 820, the method of 819 further comprises receiving, with the communication device of the electronic device from the companion electronic device, a request for the electronic device to display a content marker at a user interface of the electronic device indicating that the electronic device is the secure electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, at a user interface of the electronic device, a request to authenticate the electronic device as a secure electronic device;
   transmitting, with a communication device, the request to authenticate the electronic device to a remote electronic device across a network;
   receiving, with the communication device from the remote electronic device, a security challenge;
   obtaining, with one or more processors, a response to the security challenge using a secret key stored in an encrypted memory of the electronic device; and
   transmitting the response to the security challenge to the remote electronic device;
   wherein the communication device receives the response to the security challenge from the remote electronic device and determines whether the response to the security challenge matches the expected response before any user identification credentials or other user personal information is entered to the remote electronic device and the one or more processors present a shared secret content marker on the user interface.

2. The method of claim 1, the secret key comprising a manufacturer-programmed key programmed into the encrypted memory during the manufacture of the electronic device.

3. The method of claim 1, further comprising
   receiving, with the communication device from the remote electronic device, the shared secret content marker.

4. The method of claim 3, the shared secret content marker comprising one or more graphical images, the presenting comprising displaying the one or more graphical images on a display of the electronic device.

5. The method of claim 3, the shared secret content marker comprising one or more audio signals, the presenting comprising emitting the one or more audio signals by one or more loudspeakers of the electronic device.

6. The method of claim 3, wherein:
   the request to authenticate the electronic device as the secure electronic device is received from a person attempting to authenticate the electronic device; and
   the shared secret content marker is known only to the person attempting to authenticate the electronic device.

7. The method of claim 3, further comprising:
   requesting, by the one or more processors at the user interface, user identification credentials;
   receiving, by the one or more processors at the user interface, the user identification credentials; and
   transmitting, with the communication device to the remote electronic device, the user identification credentials.

8. An electronic device, comprising:
   a communication device in communication with a remote electronic device;
   one or more processors operable with the communication device; and
   an encrypted memory operable with the one or more processors;
   the communication device receiving a request to authenticate the remote electronic device as a secure electronic device;
   the one or more processors generating a security challenge in response to receiving the request;

the communication device transmitting the security challenge to the remote electronic device and receiving a response to the security challenge from the remote electronic device; and the one or more processors determining whether the response to the security challenge from the remote electronic device matches an expected response to the security challenge that is a function of a secret key assigned to the remote electronic device;

wherein the communication device receives the response to the security challenge from the remote electronic device and determines whether the response to the security challenge matches the expected response before any user identification credentials or other user personal information is entered to the remote electronic device and the one or more processors present a shared secret content marker identifying the electronic device as the secure electronic device on a user interface.

9. The electronic device of claim 8, the communication device also receiving one of a companion electronic device identifier or one or more user identification credentials from the remote electronic device.

10. The electronic device of claim 9, the one or more processors determining whether the one of the companion electronic device identifier matches an expected companion device identifier or the one or more user identification credentials match one or more expected user identification credentials and, where the one of the companion electronic device identifier matches the expected companion device identifier or the one or more user identification credentials match the one or more expected user identification credentials, the one or more processors:

obtaining, from the encrypted memory, a shared secret; and causing the communication device to transmit the shared secret to the remote electronic device.

11. The electronic device of claim 10, wherein the shared secret comprises a shared secret content marker known only to a user of the remote electronic device.

12. The electronic device of claim 10, wherein the remote electronic device comprises a companion electronic device in communication with another electronic device.

13. The electronic device of claim 12, the one or more processors further obtaining, from the encrypted memory, a security message that is a function of another shared key stored in the encrypted memory, and causing the communication device to transmit the security message to the remote electronic device.

14. A method in an electronic device, the method comprising:

receiving, with a communication device of the electronic device from a companion electronic device in electronic communication with the communication device, a request for a remote electronic device to authenticate the electronic device as a secure electronic device;

transmitting, with the communication device of the electronic device to the remote electronic device across a network, the request for the remote electronic device to authenticate the electronic device as the secure electronic device;

receiving, with the communication device of the electronic device from the remote electronic device across the network, a security challenge;

obtaining, with one or more processors of the electronic device using a secret key stored in an encrypted memory of the electronic device, a response to the security challenge; and transmitting, with the communication device to the remote electronic device across the network, the response to the security challenge before any user identification credentials are released by the companion electronic device; and presenting a shared secret content marker identifying the electronic device as the secure electronic device on a user interface of the electronic device.

15. The method of claim 14, the receiving the request for the remote electronic device to authenticate the electronic device as the secure electronic device occurring at a physical connector of a communication interface of the electronic device.

16. The method of claim 14, further comprising:

receiving, with the communication device of the electronic device from the companion electronic device, a companion electronic device identifier; and transmitting, with the communication device of the electronic device to the remote electronic device across the network, the companion electronic device identifier.

17. The method of claim 16, further comprising:

receiving, with the communication device of the electronic device from the remote electronic device across the network, a shared secret that is a function of another secret key stored within another memory of the remote electronic device; and delivering, with the communication device of the electronic device to the companion electronic device, the shared secret.

18. The method of claim 17, further comprising receiving, with the communication device of the electronic device from the companion electronic device, a determination of whether the shared secret matches an expected shared secret stored in an encrypted memory of the companion electronic device.

19. The method of claim 18, further comprising, when the shared secret received from the remote electronic device matches the expected shared secret stored in the encrypted memory of the companion electronic device, receiving, with the communication device of the electronic device from the companion electronic device, one or more user identification credentials stored in the encrypted memory of the companion electronic device.

20. The method of claim 19, further comprising receiving, with the communication device of the electronic device from the companion electronic device, a request for the electronic device to display a content marker at a user interface of the electronic device indicating that the electronic device is the secure electronic device.

* * * * *